United States Patent
Kojima

(10) Patent No.: US 9,161,279 B2
(45) Date of Patent: Oct. 13, 2015

(54) METHOD FOR CONTROLLING LOAD, BASE STATION AND MANAGEMENT DEVICE

(75) Inventor: Yuji Kojima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 686 days.

(21) Appl. No.: 13/246,081

(22) Filed: Sep. 27, 2011

(65) Prior Publication Data

US 2012/0082028 A1    Apr. 5, 2012

(30) Foreign Application Priority Data

Sep. 30, 2010   (JP) .................................. 2010-222379

(51) Int. Cl.
*H04W 36/22*    (2009.01)
*H04W 36/00*    (2009.01)
*H04W 92/20*    (2009.01)

(52) U.S. Cl.
CPC .......... *H04W 36/22* (2013.01); *H04W 36/0016* (2013.01); *H04W 92/20* (2013.01)

(58) Field of Classification Search
CPC ....... H04L 47/10; H04L 47/14; H04L 47/125; H04L 47/22; H04L 47/70; H04W 36/00; H04W 36/245; H04W 36/22; H04W 36/0016; H04W 92/20
USPC .............. 370/229, 230, 230.1, 231, 235, 310, 370/328, 329, 331, 332, 351, 389, 395.1, 370/395.2; 455/403, 422.1, 436, 439, 450, 455/453

See application file for complete search history.

(56) References Cited

U.S. PATENT DOCUMENTS

| | | | |
|---|---|---|---|
| 6,754,494 B1 | 6/2004 | Yoshimura | |
| 7,024,203 B1 * | 4/2006 | Naghian | 455/453 |
| 7,076,254 B2 * | 7/2006 | Muhonen et al. | 455/453 |
| 2004/0121777 A1 * | 6/2004 | Schwarz et al. | 455/452.1 |
| 2009/0163223 A1 * | 6/2009 | Casey | 455/453 |
| 2010/0234026 A1 * | 9/2010 | Tenny et al. | 455/436 |
| 2010/0240367 A1 * | 9/2010 | Lee et al. | 455/435.2 |
| 2011/0244874 A1 * | 10/2011 | Fodor et al. | 455/450 |

FOREIGN PATENT DOCUMENTS

| | | |
|---|---|---|
| JP | 7-236173 A | 9/1995 |
| JP | 2001-169323 A | 6/2001 |
| JP | 2008-16970 A | 1/2008 |

* cited by examiner

*Primary Examiner* — Obaidul Huq
(74) *Attorney, Agent, or Firm* — Myers Wolin, LLC

(57) ABSTRACT

A method for controlling a load in a base station device, including: receiving load information from another base station; receiving, from the other base station, admission information that indicates that an admission of a process request for the other base station to perform a first process is permitted or rejected; storing history information in which the received load information is associated with the admission information; and determining, on the basis of load information newly received from the other base station and the stored history information, whether to request the other base station to perform a second process that causes a load that is equivalent to or lower than the first process.

9 Claims, 21 Drawing Sheets

FIG. 1 "PRIOR ART"

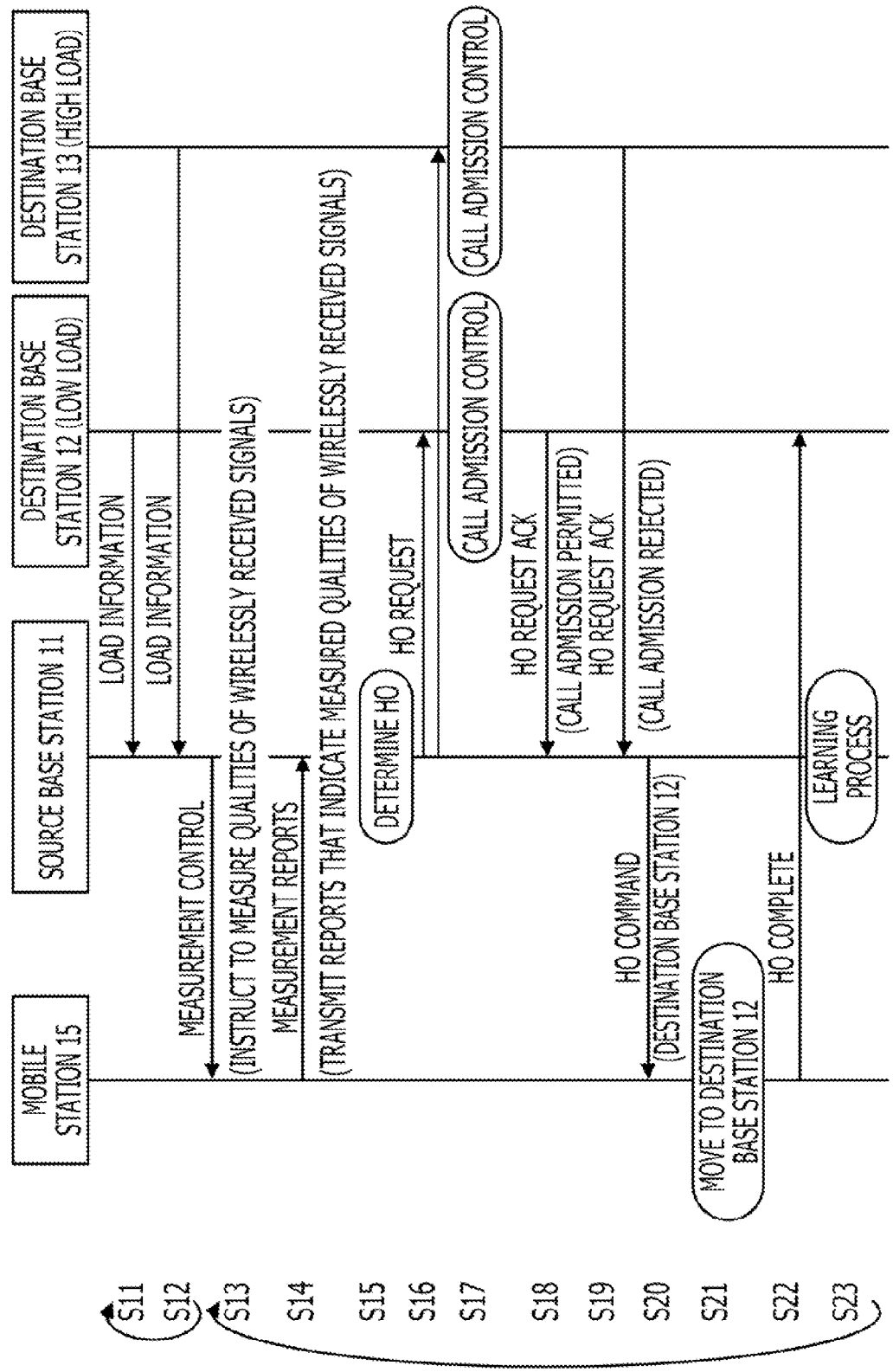

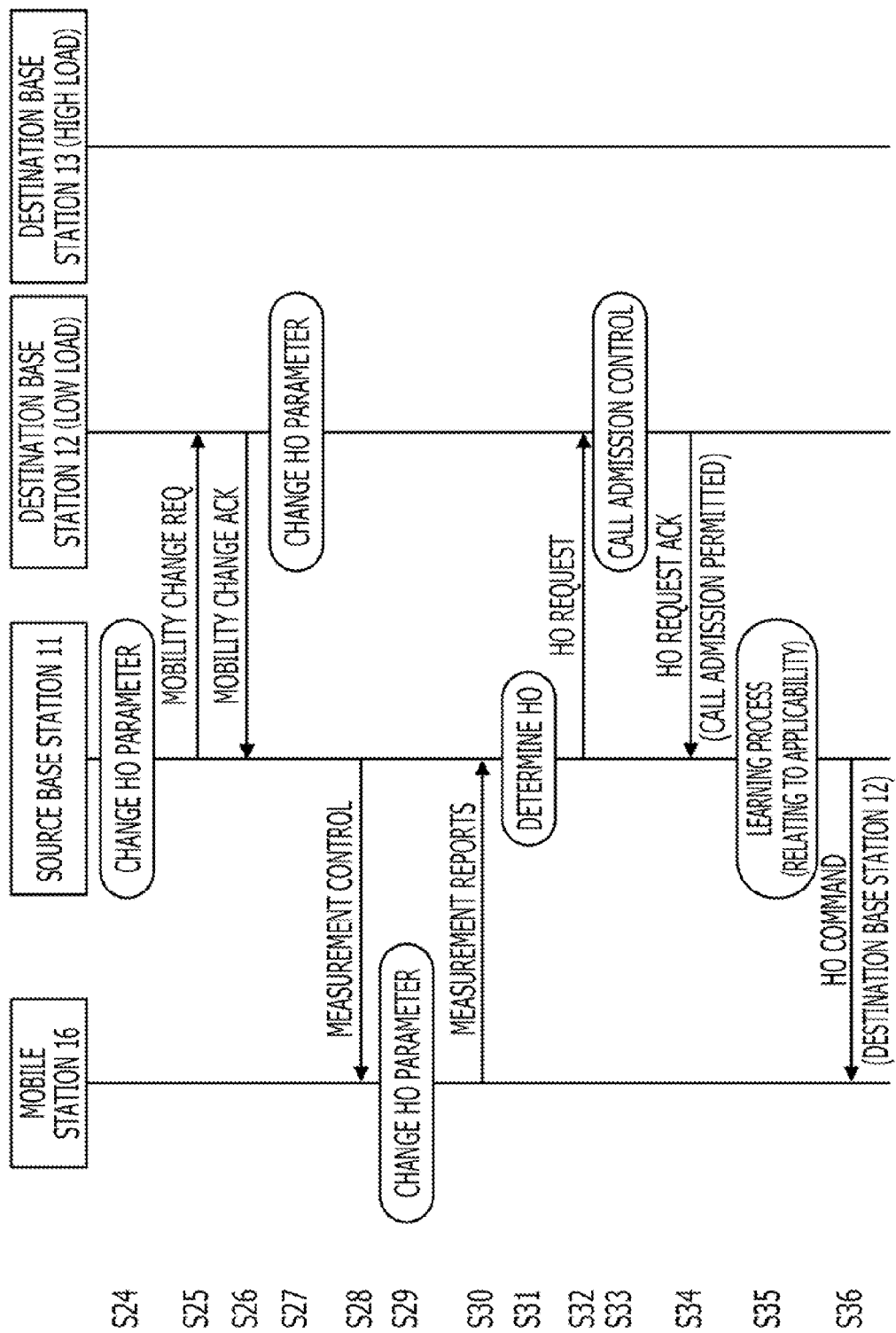

FIG. 8A

LEARNING TABLE FOR GUARANTEED BIT RATE CALL

| TIME STAMP | WIRELESS RESOURCE USAGE OF GUARANTEED BIT RATE CALL OF DESTINATION BASE STATION | RESULT OF CALL ADMISSION CONTROL |
|---|---|---|
| 10:42:10.100 | 82 | PERMITTED |
| 10:42:10.200 | 80 | PERMITTED |
| 10:42:10.250 | 83 | REJECTED |
| 10:42:10.400 | 84 | REJECTED |

FIG. 8B

LEARNING RESULT OF GUARANTEED BIT RATE CALL

| TIME STAMP | WIRELESS RESOURCE USAGE OF GUARANTEED BIT RATE CALL OF DESTINATION BASE STATION | AGING TIMER |
|---|---|---|
| 10:42:20.000 | 83% OR HIGHER IS HIGH LOAD | 10 MINUTES |

FIG. 19A

LEARNING TABLE FOR GUARANTEED BIT RATE CALL

| TIME STAMP | WIRELESS RESOURCE USAGE OF GUARANTEED BIT RATE CALL OF SOURCE BASE STATION | RECEPTION OF HANDOVER REQUEST |
|---|---|---|
| 10:42:10.100 | 82 | RECEIVED |
| 10:42:10.200 | 80 | RECEIVED |
| 10:42:10.250 | 83 | NOT RECEIVED |
| 10:42:10.400 | 84 | NOT RECEIVED |

FIG. 19B

LEARNING RESULT OF GUARANTEED BIT RATE CALL

| TIME STAMP | WIRELESS RESOURCE USAGE OF GUARANTEED BIT RATE CALL OF DESTINATION BASE STATION | AGING TIMER |
|---|---|---|
| 10:42:20.000 | 83% OR HIGHER IS HIGH LOAD | 10 MINUTES |

METHOD FOR CONTROLLING LOAD, BASE STATION AND MANAGEMENT DEVICE

CROSS-REFERENCE TO RELATED APPLICATION

This application is based upon and claims the benefit of priority from the prior Japanese Patent Application No. 2010-222379 filed on Sep. 30, 2010, the entire contents of which are incorporated herein by reference.

FIELD

The present invention relates to a method for controlling a load in a base station device, a base station and a management device.

BACKGROUND

The third generation partnership project (3GPP) has standardized Long Term Evolution (LTE) that is a wireless communication standard for the 3.9 generation cellular technology. As illustrated in FIG. 1, for LTE, standard specifications have been established to exchange load information between base stations (eNB) 1 and 2 using an inter-base station interface (X2 interface). Information elements of the load information are periodically exchanged between the base stations. The information elements are (1) downlink (DL)/uplink (UL) guaranteed bit rate (GBR) physical resource block (PRB) usage (i.e., wireless resource usage of a guaranteed bit rate call such as an audio call; (2) DL/UL non-GBR PRB usage (i.e., wireless resource usage of a best-effort call such as web browsing); (3) DL/UL total PRB usage (i.e., wireless resource usage of all calls); (4) a DL/UL hardware load indicator; and (5) a DL/UL S1 transport network layer (S1TNL) load indicator (i.e., a wired load indicator).

In handover (HO) load balancing optimization that is one of use cases of a self-optimization network (SON), a handover parameter is changed to prompt a mobile station (user equipment (UE)) to perform handover from a high-load base station to a low-load base station in order to balance loads.

The handover parameter is an offset value that is added to the quality of a signal wirelessly received from a source base station (serving base station) for the quality of a signal wirelessly received from a destination base station (target base station). The destination base station is a handover destination, while the source base station is a handover source. As indicated by the following formula, as the offset value becomes smaller, the mobile station more readily performs handover to the destination base station.

The quality of the signal wirelessly received from the destination base station>the quality of the signal wirelessly received from the source base station+the offset value An offset value can be set in a certain source base station for each of a plurality of destination base stations.

The source base station transmits the offset value to the mobile station. The mobile station measures the qualities of signals wirelessly received from the destination base stations. When the measurement result satisfies the aforementioned formula, the mobile station transmits, to the source base station, a report that indicates the measurement result. Then, the source base station that receives the report specifies a destination base station satisfying the aforementioned formula as a candidate for a handover destination base station. Then, the source base station instructs, on the basis of the result of call admission control (described later), the mobile station to perform handover to the destination base station.

For example, in FIG. 1, the high-load base station 2 changes a handover parameter and prompts the mobile station 3 to perform handover to the low-load base station 1, and the mobile station 3 performs handover from the base station 2 to the base station 1.

FIG. 2 is a call flow diagram illustrating conventional call admission control. In FIG. 2, a source base station 1A that is a handover source of a certain mobile station selects, as candidates for a handover destination base station, a plurality of base stations 2A and 2B (satisfying the aforementioned formula, for example) from which a mobile station 3A can wirelessly receive signals with certain or higher qualities (in steps S1 to S3). The source base station 1A transmits handover requests (HO requests) to the destination base stations (2A and 2B) (in step S4).

The destination base stations 2A and 2B confirm loads of the destination base stations 2A and 2B, respectively (in step S5). When the base station 2A can admit the mobile station 3A, the base station 2A transmits, to the source base station 1A, a response (HO Request Ack) that indicates that the admission is permitted (in step S6). When the base station 2B cannot admit the mobile station 3A, the base station 2B transmits, to the source base station 1A, a response (HO Request Ack) that indicates that the admission is rejected (in step S7).

The source base station 1A transmits a handover command (HO command) to the mobile station 3A and instructs the mobile station 3A to perform handover to the base station 2A that permits the admission and is specified as a handover destination base station (in step S8). The series of admission control is generally called call admission control (CAC). The mobile station 3A performs handover to the specified destination base station 2A (in steps S9 and S10).

The following technique (refer to, for example, Japanese Unexamined Patent Application Publication No. 2001-169323) is known. The technique is to learn the qualities of signals that are data that is obtained between a mobile station and a plurality of base stations in the past and chronologically arranged, learn past handover destinations, and select a target base station on the basis of similarities between the qualities of signals that are data currently obtained and chronologically arranged and the qualities of the signals that are data obtained in the past and chronologically arranged.

In addition, the following technique (refer to, for example, Japanese Unexamined Patent Application Publication No. 7-236173) is known. The technique is to classify all traffic channels into a first channel group of traffic channels having the same priority and a second channel group of traffic channels each having priorities that are specific to base stations, change the priorities on the basis of measured levels of interference waves of the traffic channels of the second channel group, measure desired-to-interference wave ratios of traffic channels in order from a traffic channel having the highest priority at the time of a request for an assignment of a traffic channel, and assign the traffic channel when the desired-to-interference wave ratio of the traffic channel is equal to or higher than a predetermined threshold.

In addition, the following technique (refer to, for example, Japanese Unexamined Patent Application Publication No. 2008-16970) is known. The technique is to generate handover history information (that includes information of a cell used for communication every time a mobile terminal performs handover; and successful and failed results of handover performed when a preprocess is not performed), calculate a failure rate of handover to a handover destination cell, and perform the preprocess for the handover destination cell when the failure rate is high.

SUMMARY

According to an aspect of the invention, a method for controlling a load in a base station device, including: receiving load information from another base station; receiving, from the other base station, admission information that indicates that an admission of a process request for the other base station to perform a first process is permitted or rejected; storing history information in which the received load information is associated with the admission information; and determining, on the basis of load information newly received from the other base station and the stored history information, whether to request the other base station to perform a second process that causes a load that is equivalent to or lower than the first process.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6A is a call flow diagram illustrating a process to be performed by the wireless communication system according to the first embodiment.

FIG. 6B is a call flow diagram illustrating the process to be performed by the wireless communication system according to the first embodiment.

FIG. 19A is a diagram illustrating a learning table.

FIG. 19B is a diagram illustrating a learning result.

DESCRIPTION OF EMBODIMENTS

When a manufacturer (vendor) of a source base station is different from a manufacturer (vendor) of a destination base station, and the source station receives load information of the destination base station from the destination base station, the source base station cannot detect which load level the destination base station determines as a high load. This is due to the fact that an implementation for interpreting load information varies depending on the vendor. When a load level that is determined as a high load is not clear, it is not possible to select, on the basis of load information, a base station that receives a load. Thus, there has been a problem that loads cannot be balanced by changing a handover parameter relating to a selected base station.

In addition, when the load level that is determined as the high load is not clear, a handover request is transmitted to a high-load base station that will reject a call admission in call admission control. Thus, there has been a problem that a process of transmitting and receiving a message in the call admission control is useless.

Figure 1:
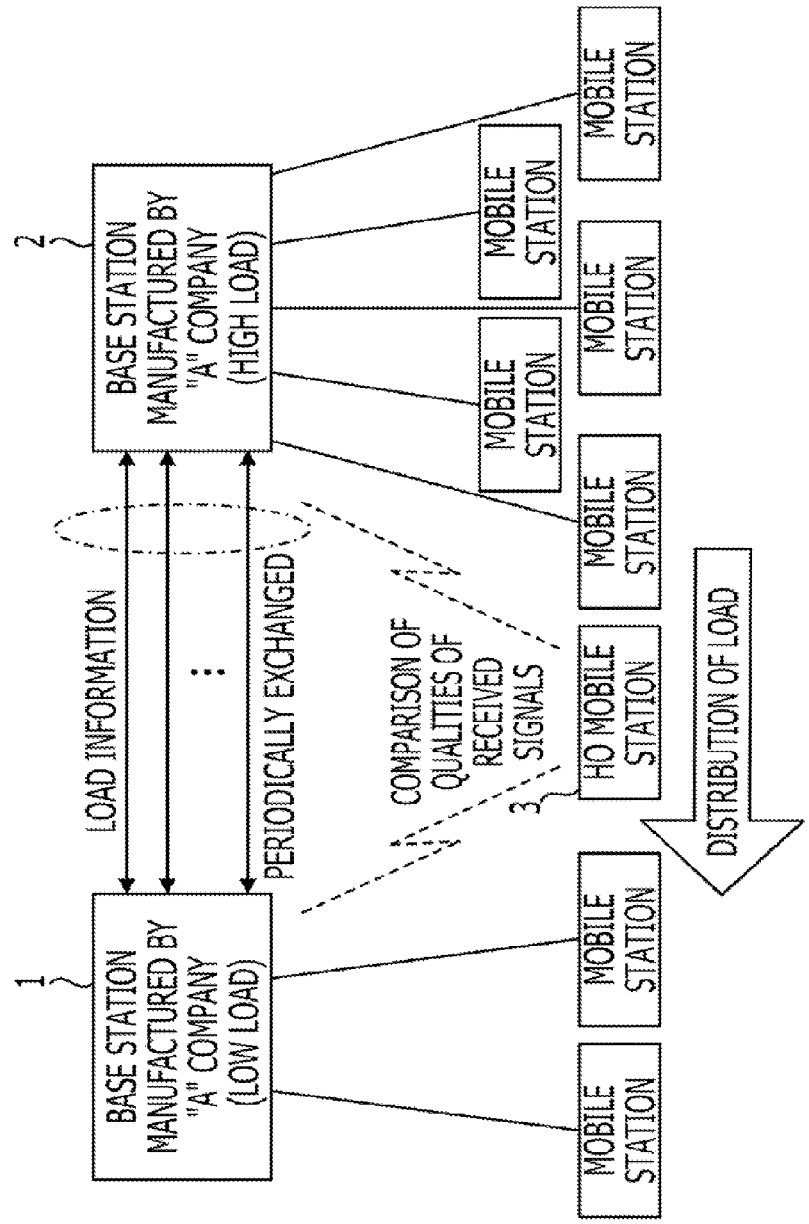
FIG. 1 is a diagram illustrating exchange of load information between base stations.
Figure 2:
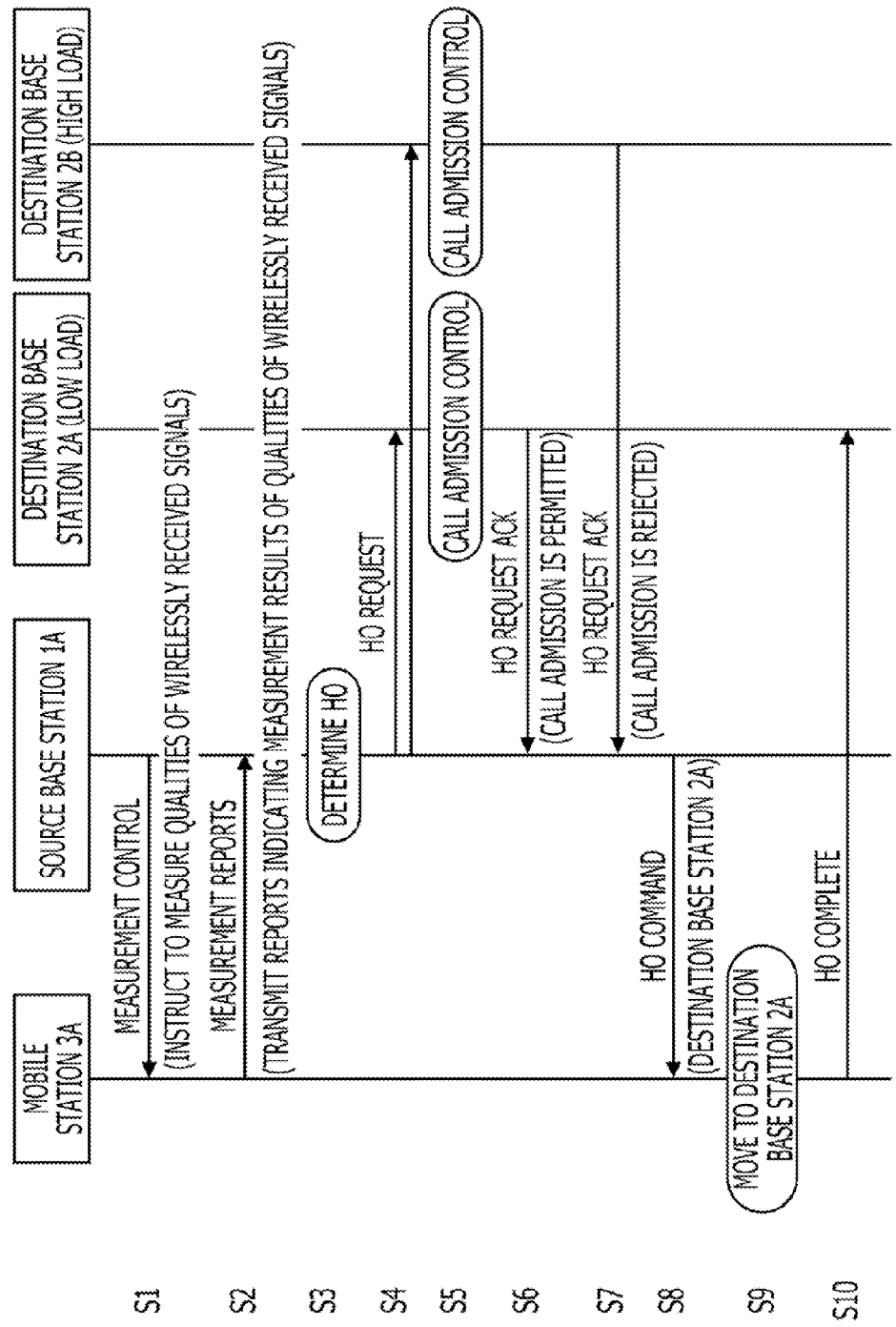
FIG. 2 is a call flow diagram illustrating conventional call admission control.
Figure 3:
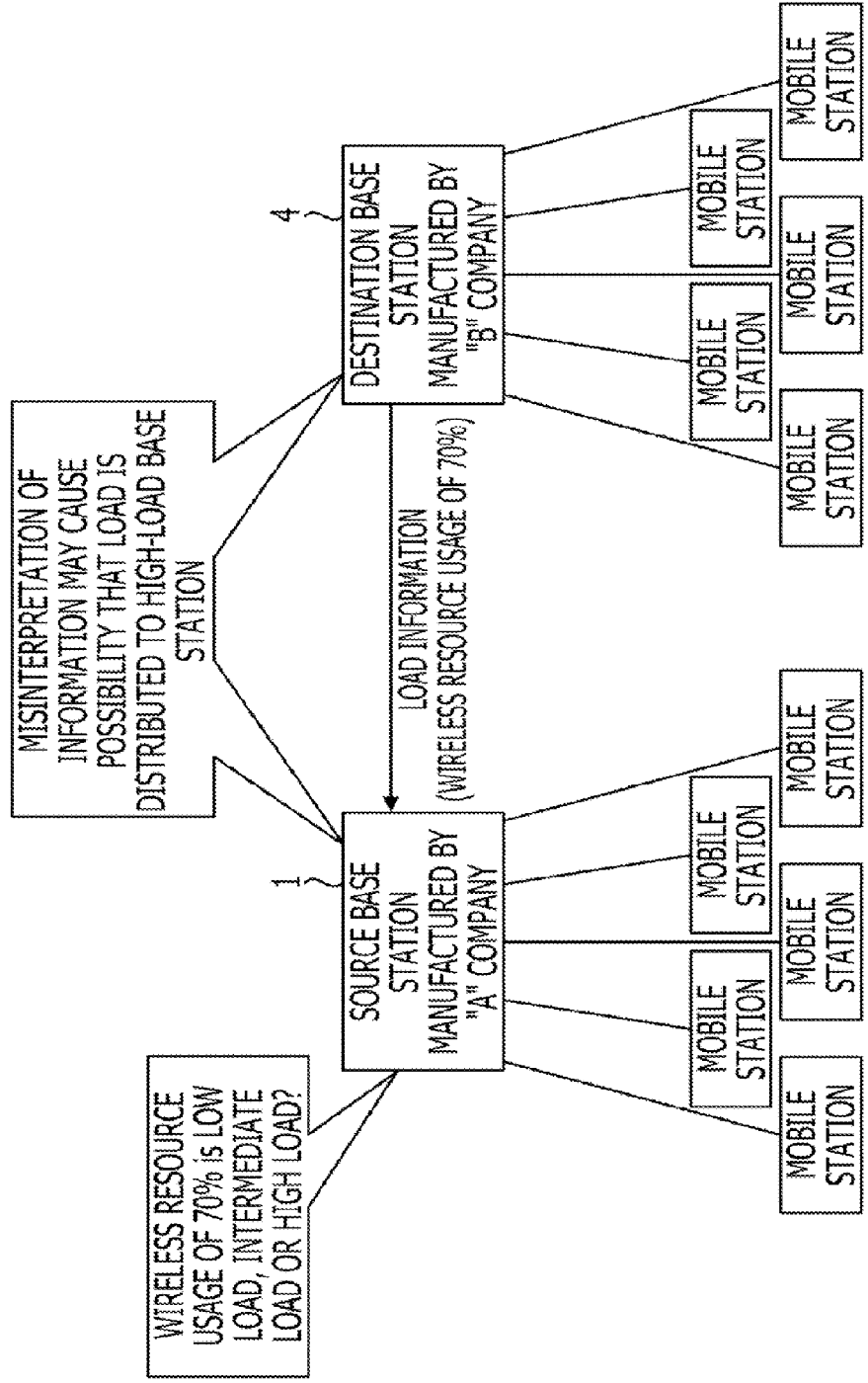
FIG. 3 is a diagram illustrating problems with a conventional system.

The problems are described in detail with reference to FIG. 3. A source base station 1 that is manufactured by "A" company can acquire, in accordance with standard specifications, information that indicates wireless usage of 70% as load information of a destination base station 4 manufactured by "B" company, for example. However, since the implementation for interpreting load information varies depending on the vendor, it is not clear that the destination base station 4 that is manufactured by "B" company determines the wireless usage of 70% as a low load, an intermediate load or a high load. The same applies to information elements (such as a hardware load indicator and a wired load indicator) of load information. Even when only a value of a certain information element is transmitted, it is not clear that the interested load information should be interpreted as a low, intermediate or high load.

When the load information is misinterpreted, there is a possibility that when the destination base station 4 that is manufactured by "B" company determines that a load of the destination base station 4 is high, the source base station 1 that is manufactured by "A" company may not determine that the load of the destination base station 4 is high, and the source base station 1 may distribute a load to the destination base station 4 manufactured by "B" company. However, the load should not be distributed to the high-load base station. In the call admission control, the source base station 1 that is manufactured by "A" company may transmit a handover request to the high-load destination base station 4 (manufactured by "B" company) that will reject a call admission. In this case, the high-load destination base station 4 that is manufactured by "B" company rejects the call admission, and a process of transmitting and receiving a message in the call admission control is useless.

A load control method disclosed herein is provided for the purpose of balancing loads in an efficient manner.

Embodiments are described with reference to the accompanying drawings.

First Embodiment

Figure 4:
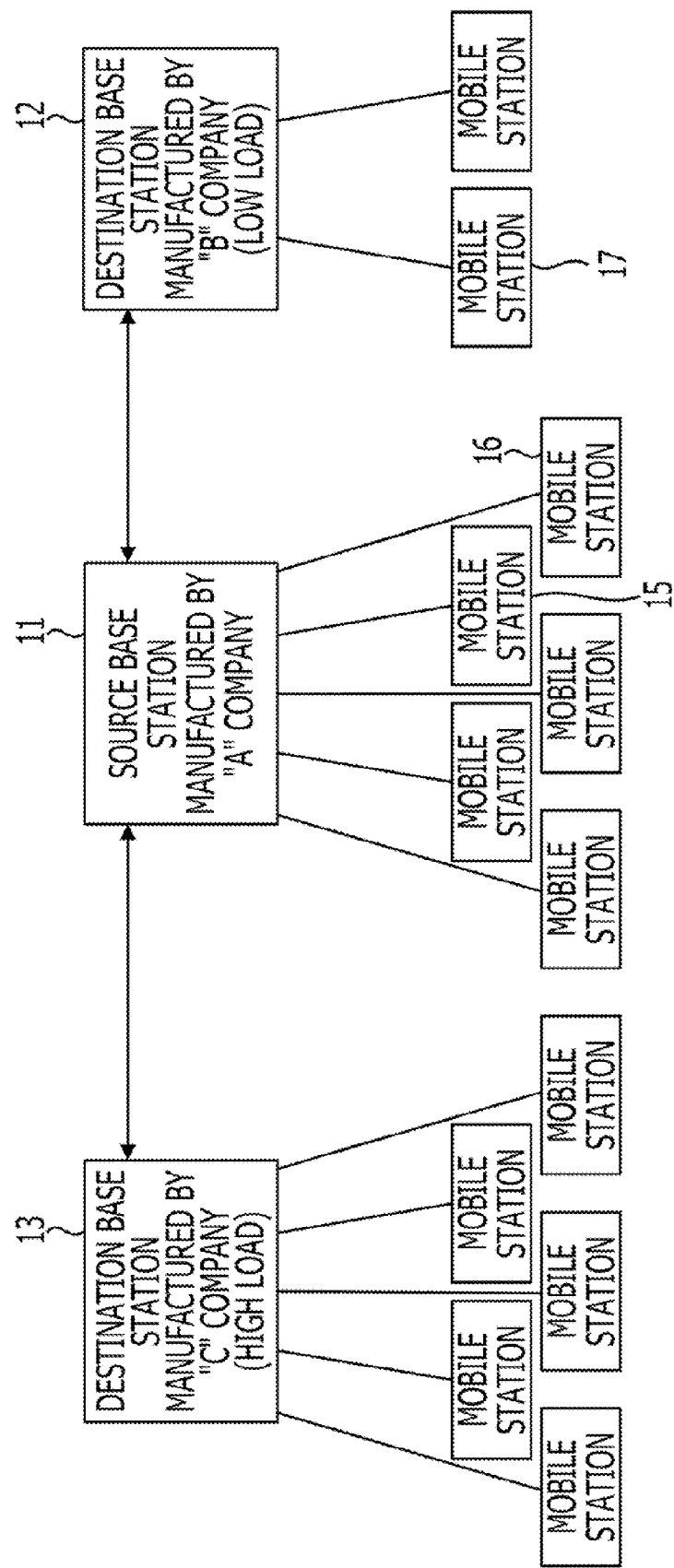
FIG. 4 is a diagram illustrating a configuration of a wireless communication system according to a first embodiment.

FIG. 4 is a diagram illustrating a configuration of a wireless communication system according to a first embodiment. In FIG. 4, a source base station 11 receives load information of a destination base station 12 and load information of a destination base station 13 and learns loaded states of the destination base stations 12 and 13 that determine that loads of the destination base stations 12 and 13 are high, respectively. Manufacturers of the base stations 11, 12 and 13 are different from each other. For example, mobile stations 15, 16 and the like are wirelessly connected to the base station 11, while mobile stations 17 and the like are wirelessly connected to the base station 12.

Figure 5:
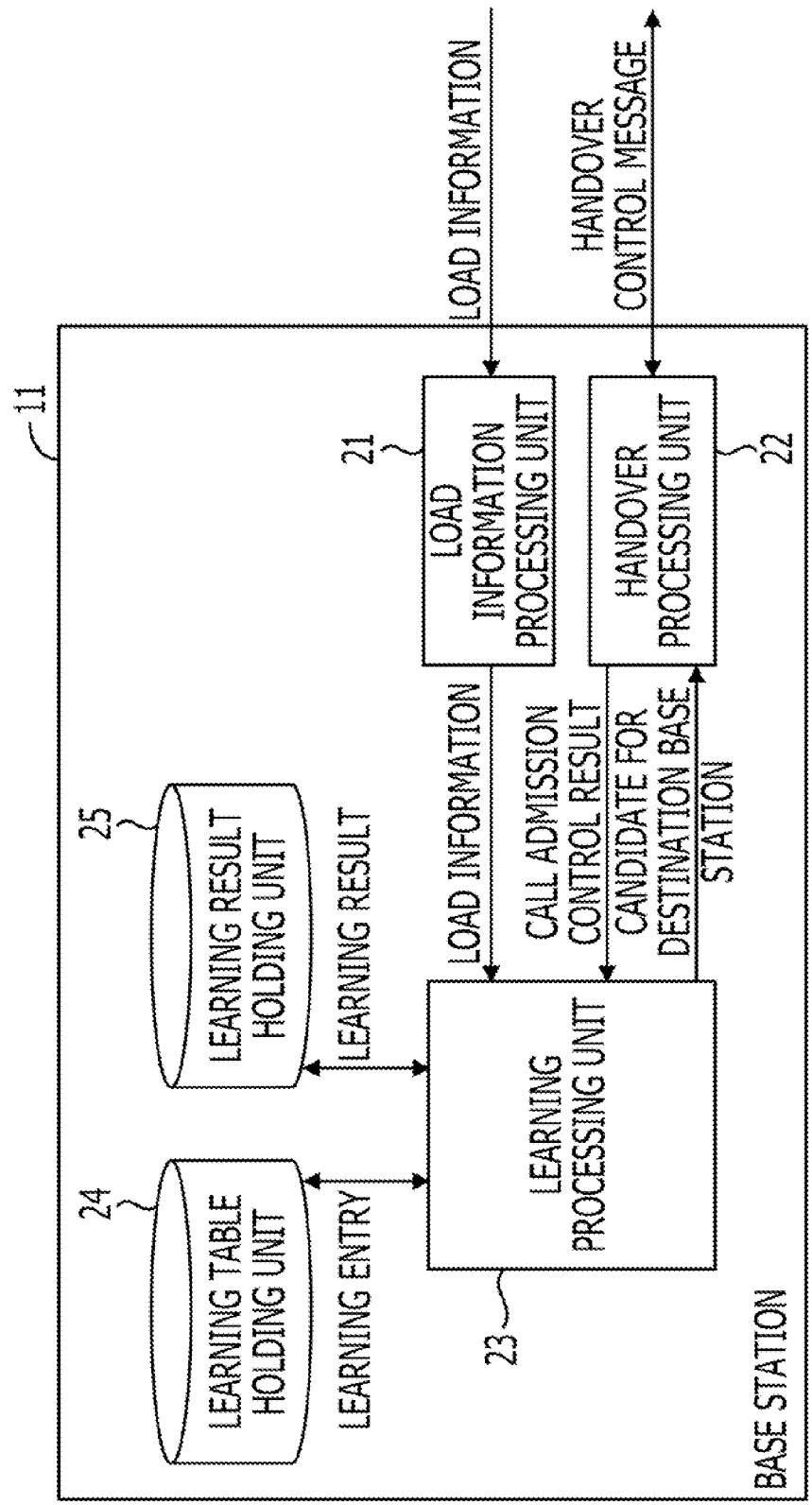
FIG. 5 is a block diagram illustrating a source base station according to the first embodiment.

FIG. 5 is a block diagram illustrating the source base station 11 according to the first embodiment. The source base station 11 includes a load information processing unit 21, a handover processing unit 22, a learning processing unit 23, a learning table holding unit 24 and a learning result holding unit 25.

The load information processing unit 21 generates load information and receives load information. The handover processing unit 22 changes a handover parameter, transmits a handover request, performs call admission control, and the like. The learning processing unit 23 learns a loaded state of a destination base station on the basis of the result of the call admission control and load information (of the destination base station) obtained during the call admission control. The learning table holding unit 24 holds the result of the call admission control and the load information (of the destination base station) obtained during the call admission control. The learning result holding unit 25 holds a learning result calculated from loaded states of the destination base station that determines that a load of the destination base station is high.

When a mobile station will perform handover from the destination base station 12 or 13 to the source base station 11, the destination base station 12 or 13 serves as a source base station. Thus, the destination base stations 12 and 13 each have the same units as the source base station 11.

FIGS. 6A and 6B are call flow diagrams illustrating a process to be performed by the wireless communication system according to the first embodiment. In FIG. 6A, in steps S11 and S12, the load information processing unit 21 of the source base station 11 receives load information from the destination base station 12 and the destination base station 13. The load information includes a plurality of information elements such as wireless resource usage of a guaranteed bit rate call, wireless resource usage of a best-effort call, wireless resource usage of all calls, a hardware load indicator, and a wired load indicator. The load information processing unit 21 of the source base station 11 periodically and repeatedly receives the aforementioned load information.

In step S13, the handover processing unit 22 of the source base station 11 transmits a measurement control message to the mobile station 15 belonging to the source base station 11 and instructs the mobile station 15 to measure the qualities of wirelessly received signals. In this case, the source base station 11 transmits an offset value to the mobile station 15 using the measurement control message. The offset value is a handover parameter.

In step S14, the mobile station 15 measures the qualities of signals wirelessly received from the base stations, and transmits, as the measurement results to the source base station 11, measurement reports that indicate destination base stations from which the measurement results that satisfy a measurement report requirement is obtained. The measurement report requirement is that the quality of a signal wirelessly received from a destination base station>the quality of a signal wirelessly received from the source base station+the offset value.

In this example, the destination base station 12 and the destination base station 13 are reported as the measurement results.

In step S15, the handover processing unit 22 of the source base station 11 that receives the report specifies the destination base station 12 and the destination base station 13 as candidates for a handover destination base station.

In step S16, the handover processing unit 22 of the source base station 11 transmits handover requests (HO requests) to the destination base stations 12 and 13 that are the candidates for the handover destination base station.

Steps S16 to S19 indicate procedures of the call admission control. In step S17, the destination base station 12 and the destination base station 13 perform the call admission control for handover.

In step S18, the handover processing unit 22 of the source base station 11 receives, from the destination base station 12, a call admission control result that indicates that a call admission is permitted. In step S19, the handover processing unit 22 of the source base station 11 receives, from the destination base station 13, a call admission control result that indicates that the call admission is rejected.

In step S20, the handover processing unit 22 of the source base station 11 specifies the destination base station 12 (that permits the call admission) as a handover destination base station, and transmits a handover command (HO command) to the mobile station 15.

In steps S21 and S22, the mobile station 15 performs handover to the specified destination base station 12.

In step S23, the learning processing unit 23 of the source base station 11 combines the call admission control results (acquired from the handover processing unit 22) of the call admission control with the load information (obtained during the call admission control and acquired from the load information processing unit 21) of the destination base stations, stores the combined information for a certain time period, and learns, from the stored information, a loaded state of a destination base station that determines that a load of the destination base station is high.

Figure 7:
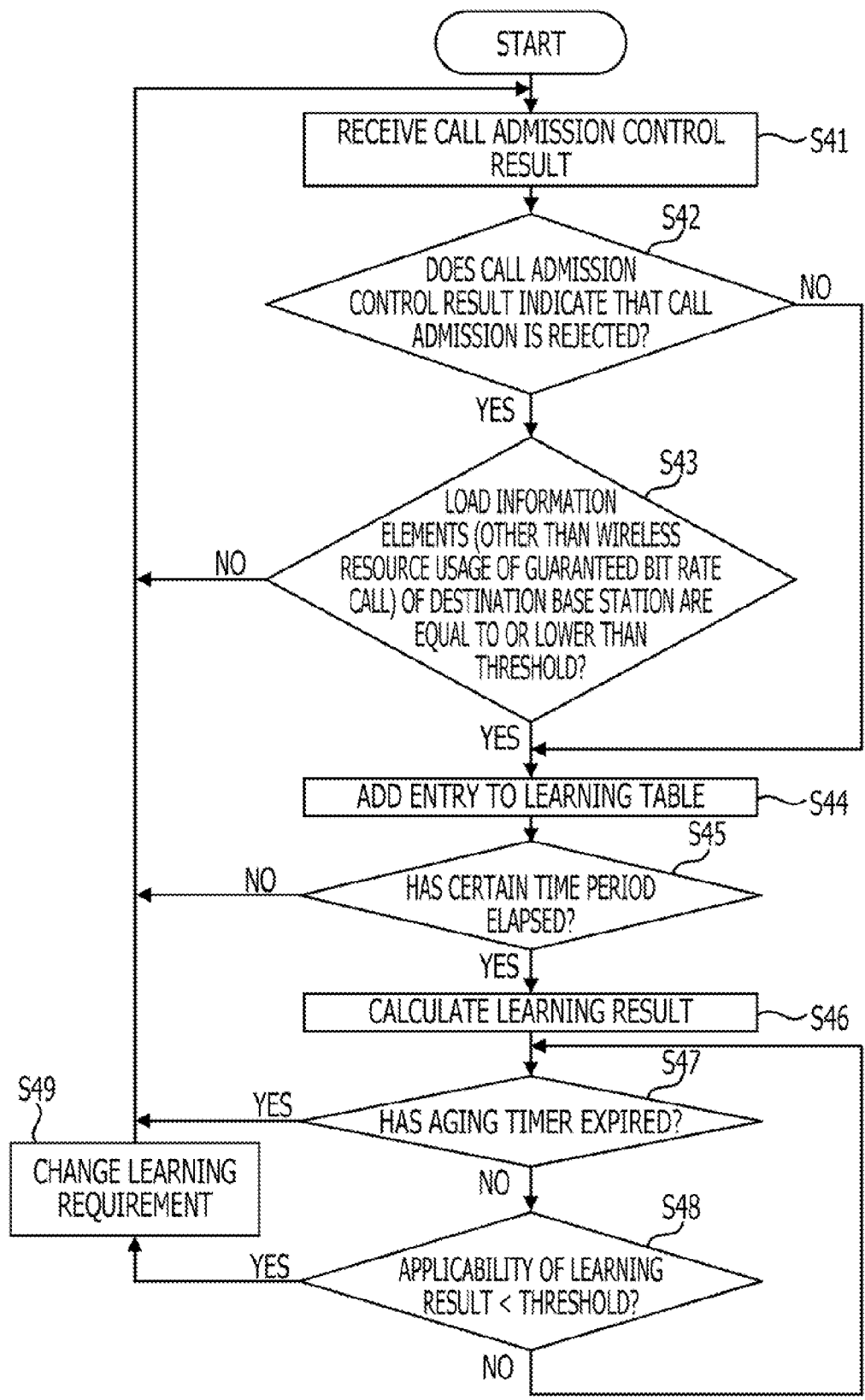
FIG. 7 is a flowchart of a learning process according to the first embodiment.

FIG. 7 is a flowchart of a learning process according to the first embodiment. The learning process is performed by the learning processing unit 23 of the source base station. In FIG. 7, in step S41, the learning processing unit 23 of the source base station 11 receives a call admission control result from the handover processing unit 22.

In step S42, the learning processing unit 23 of the source base station 11 determines whether or not the call admission control result indicates that the call admission is rejected. When the call reception result indicates that the call admission is rejected, the learning process proceeds to step S43 so that step S43 is performed. When the call admission control result does not indicate that the call admission is rejected, the learning process skips step S43.

When the learning processing unit 23 of the source base station 11 receives the call admission control result, or during the call admission control, the learning processing unit 23 of the source base station 11 determines whether or not the wireless resource usage of the best-effort call, the wireless resource usage of all the calls, the hardware load indicator, and the wired load indicator, which are the elements (other than the wireless resource usage of the guaranteed bit rate call) of the load information of the destination base station, are all equal to or lower than a threshold in step S43. The wireless resource usage of all the calls is calculated on the basis of the wireless resource usage of the guaranteed bit rate call and the wireless resource usage of the best-effort call. Since the wireless resource usage of all the calls includes the wireless resource usage of the guaranteed bit rate call, the wireless resource usage of the guaranteed bit rate call is excluded from the elements of the load information. In the following description, load information elements refer to the load information elements that exclude the wireless resource usage of all the calls. The learning processing unit 23 acquires the load information (to be used in step S43) from the load information processing unit 21.

When the load information elements that exclude the wireless resource usage of the guaranteed bit rate call are all equal to or lower than the threshold, the learning processing unit 23 adds an entry to the learning table of the learning table holding unit 24 and causes the entry to be stored in the learning table of the learning table holding unit 24 in the next step S44. On the other hand, when at least one of the load information elements is larger than the threshold, the learning processing unit 23 does not add an entry to the learning table, and the learning process returns to step S41 in order to receive the next call admission control result. These series of steps S42 and S43 are a process of determining whether or not the cause of the rejection of the call admission is the wireless resource usage of the guaranteed bit rate call or any one or more of the other load information elements when the call admission control result indicates that the call admission is rejected. When the other load information elements are equal to or lower than the threshold and it is apparent that the load of the destination base station is low, the learning processing unit 23 estimates that the cause of the rejection of the call admission is the wireless resource usage of the guaranteed bit rate call. An initial value of the threshold is set by a designer of the system during design of the system.

Figure 8:
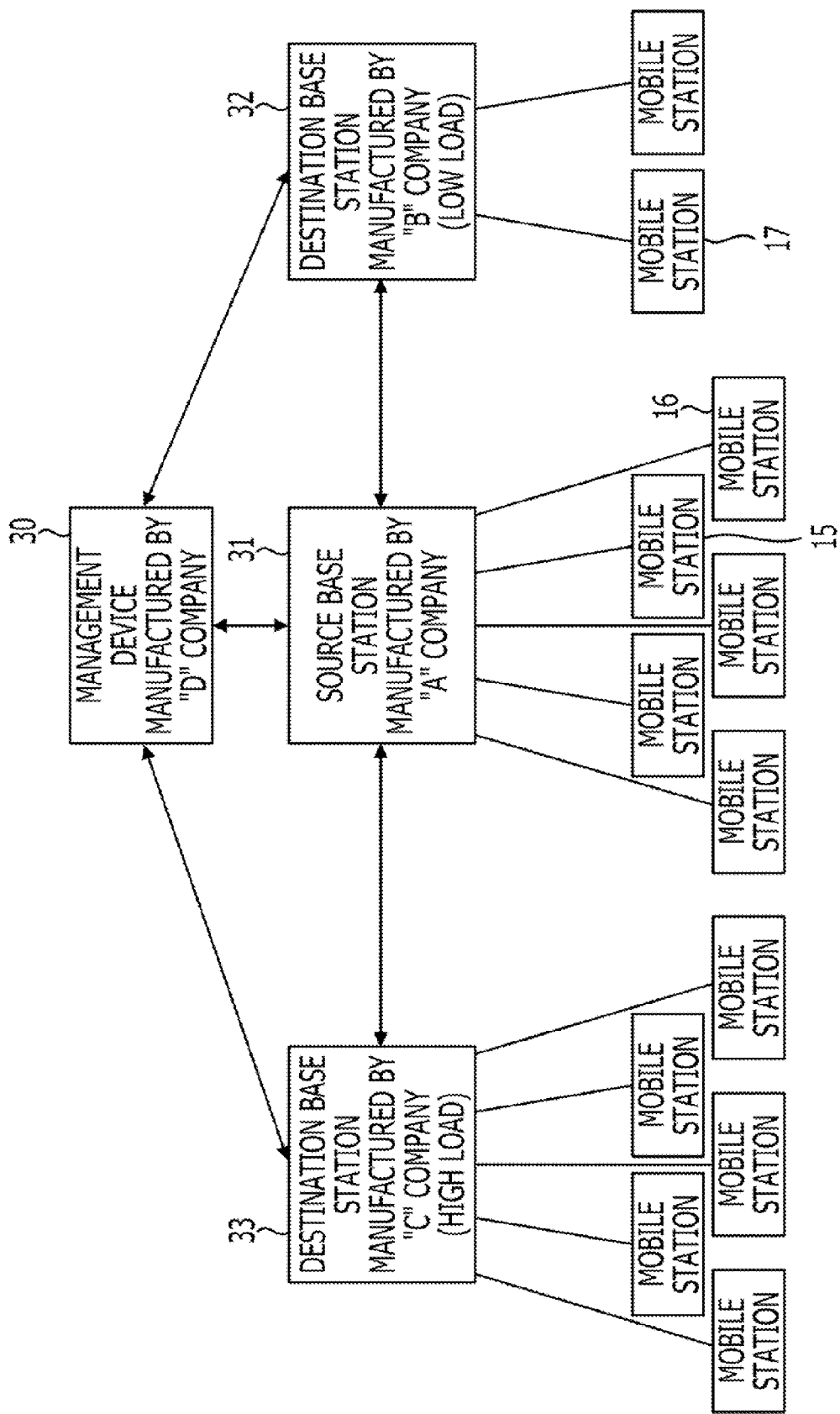
FIG. 8A is a diagram illustrating a learning table.
FIG. 8B is a diagram illustrating a learning result.

In step S44, the learning processing unit 23 of the source base station 11 adds the entry to the learning table of the learning table holding unit 24. FIG. 8A illustrates the learning table. The learning table includes a time stamp, wireless resource usage of a guaranteed bit rate call of a destination base station and the result of the call admission control.

The learning table holding unit 24 has a learning table having a configuration illustrated in FIG. 8A for each of the destination base stations. For example, the learning table illustrated in FIG. 8A is held by the source base station 11 and provided for the destination base station 12. For example, the source base station 11 receives, at 10 o'clock, 42 minutes, 10 seconds and 100 milliseconds from the destination base station 12, the call admission control result that indicates that the call admission is permitted. In this case, when the wireless resource usage of the guaranteed bit rate call of the destination base station 12 is 82%, the learning processing unit 23 adds, to the learning table, an entry that represents that the time stamp indicates 10:42:10.100; the wireless resource usage of the guaranteed bit rate call indicates 82; and the call admission control result indicates "permitted".

In step S45, the learning processing unit 23 of the source base station determines whether or not a certain time period has elapsed after the entry is added to the learning table. If the certain time period has elapsed after the entry is added, a learning result is calculated in the next step S46. If the certain time period has yet to elapse after the entry is added, the learning process returns to step S41 in order to receive the next call admission control result. The certain time period may be set by the designer of the system during the design of the system. For example, the certain time period is set to a value that is in a range of several minutes to several tens of minutes.

Since the destination base station 12 determines that a load of the destination base station 12 is low in step S18 illustrated in FIG. 6A, the destination base station 12 transmits a response to the handover request relating to the mobile station 15, and the response indicates that the call admission is permitted. However, when the loaded state is changed, the destination base station 12 may transmit a response to a handover request relating to another mobile station, and the response may indicate that the call admission is rejected. When a plurality of call admission control results that are obtained for a certain time period are stored in the learning table, the stored information can be used to calculate the learning result. Thus, steps S13 to S23 illustrated in FIG. 6A are repeatedly performed on other mobile stations.

In step S46 illustrated in FIG. 7, the learning processing unit 23 of the source base station 11 learns the information stored in the learning table of the learning table holding unit 24 so as to calculate the learning result. The learning processing unit 23 causes the learning result to be stored in the learning result holding unit 25. When the learning table has contents illustrated in FIG. 8A, the learning processing unit 23 calculates, at 10 o'clock, 42 minutes, 20 seconds and 0 milliseconds, the learning result that indicates that "the destination base station 12 determines that the load of the destination base station 12 is high when the wireless resource usage of the guaranteed bit rate call is 83% or higher", i.e., calculates a threshold for the loaded state of the destination base station that determines that the load of the destination base station is high. Then, the learning processing unit 23 causes the calculated learning result (illustrated in FIG. 8B) to be stored in the learning result holding unit 25. It is apparent from the learning table that when the wireless resource usage of the guaranteed bit rate call is lower than 83%, the call admission control result indicates that the call admission is permitted; and when the wireless resource usage of the guaranteed bit rate call is equal to or higher than 83%, the call admission control result indicates that the call admission is rejected. Thus, the learning processing unit 23 calculates the aforementioned learning result. In addition, as illustrated in FIG. 8B, the learning processing unit 23 sets a time of 10 minutes as an aging timer in the learning result, and activates the aging timer in order to start a countdown. An initial value of the aging timer may be set by the designer of the system during the design of the system. The learning result holding unit 25 counts a value that is indicated by the aging timer according to time passage.

In the aforementioned steps S43 to S46, the learning process procedures that are performed on the wireless resource usage of the guaranteed bit rate call are described as an example. Learning tables that are the same as or similar to the learning table illustrated in FIG. 8A and are provided for the other information elements included in the load information can be held by the learning table holding unit 24. The learning processing unit 23 can perform learning process procedures on each of the other information elements, while the learning process procedures are the same as or similar to the learning procedures of steps S43 to S46. Thus, the learning processing unit 23 can calculate such a learning result as illustrated in FIG. 8B for each of the other information elements.

In step S47, the learning processing unit 23 of the source base station 11 determines whether or not the aging timer has expired. When the value of the aging timer becomes 0, the aging timer expires. If the aging timer has expired, the learning process proceeds to step S41 in order to receive the next call admission control result and perform relearning. If the aging timer has yet to expire, step S48 is performed. When the learning result is calculated, and a setting or implementation of the destination base station is changed, the calculated learning result becomes invalid. Thus, the learning processing unit 23 periodically performs the relearning. Steps S48 and S49 are described when step S35 illustrated in FIG. 6B is described.

Next, steps S24 and later illustrated in the call flow diagram of FIG. 6B are described. Since the load of the source base station 11 becomes high, the handover processing unit 22 of the source base station 11 changes the handover parameter in order to distribute a load to another base station and balance loads in step S24. In this case, it is assumed that the learning processing unit 23 of the source base station 11 has already learned that the destination base station 12 determines that the load of the destination base station 12 is low and the destination base station 13 determines that a load of the destination base station 13 is high.

The handover processing unit 22 of the source base station 11 receives, from the learning processing unit 23, information that specifies the destination base station 12 as a candidate for a handover destination base station and excludes the destination base station 13 that determines that the load of the destination base station 13 is high. The source base station 11 specifies the destination base station 12 as a base station that will receive a load from the source base station 11. The source base station 11 changes the handover parameter so as to prompt the mobile station to perform handover from the source base station 11 to the destination base station 12.

For example, when a formula that expresses a requirement for handover is established, or when the quality of a signal wirelessly received from the destination base station>the quality of a signal wirelessly received from the source base station+the offset value, and the offset value that is set in the source base station 11 and provided for the destination base station 12 is reduced, the handover of the mobile station from the source base station 11 to the destination base station 12 is promoted. It should be noted that an offset value can be set in a certain source base station for each of destination base stations.

In step S25, the handover processing unit 22 of the source base station 11 transmits a request (mobility change request) to the destination base station 12 (that will receive the load from the source base station 11) and requests the destination base station 12 to change a handover parameter so that handover from the destination base station 12 to the source base station 11 is suppressed. In step S26, the handover processing unit 22 of the source base station 11 receives a response (mobility change acknowledge) to the request.

In step S27, the handover processing unit 22 of the destination base station 12 changes the handover parameter so as to suppress the handover from the destination base station 12 to the source base station 11. For example, when an offset value that is set in the source base station 12 and provided for the destination base station 11 is used in the formula expressing the requirement for handover and increased, the handover from the destination base station 12 to the source base station 11 is suppressed.

In step S28, the handover processing unit 22 of the source base station 11 transmits the changed handover parameter or the changed offset value to the mobile station 16 that belongs to the source base station 11 (measurement control).

In step S29, the mobile station 16 changes a handover parameter of the mobile station 16. Thus, the mobile station 16 can readily perform handover from the source base station 11 to the destination base station 12.

In a similar manner to steps S28 and S29, the destination base station 12 transmits the changed handover parameter or the changed offset value to the mobile station 17 that belongs to the destination base station 12, and the mobile station 17 changes a handover parameter of the mobile station 17. Thus, it becomes difficult for the mobile station 17 (belonging to the destination base station 12) to perform handover from the destination base station 12 to the source base station 11.

In step S30, the mobile station 16 measures the qualities of signals wirelessly received from the base stations, and transmits, as the measurement results to the source base station 11, measurement reports that indicate destination base stations from which the measurement results that satisfy a measurement report requirement is obtained. The measurement report requirement is that the quality of the signal wirelessly received from a destination base station>the quality of the signal wirelessly received from the source base station+the offset value.

In step S31, the handover processing unit 22 of the source base station 11 receives the measurement report that specifies the destination base station 12 as a candidate for a handover destination base station and excludes the destination base station 13 that determines that the load of the destination base station 13 is high. In step S32, the handover processing unit 22 of the source base station 11 transmits a handover request relating to the mobile station 16 to the destination base station 12. Unlike step S16, the handover processing unit 22 does not transmit a handover request to the destination base station 13 that determines that the load of the destination base station 13 is high.

In the above description, the learning processing unit 23 of the source base station 11 determines the candidate for the handover destination base station while excluding, from candidates for the handover destination base station, the destination base station 13 that determines that the load of the destination base station 13 is high. The learning processing unit 23 of the source base station 11 may determine a candidate for the handover destination base station while excluding, from candidates for the handover destination base station, a destination base station whose load is lower by a certain value than a high load. This is a process of excluding, from candidates for the handover destination base station, a destination base station whose load is not a high load and is close to the high load in order to obtain a load margin. The load margin may set by the designer of the system.

In step S33, the destination base station 12 performs the call admission control for the handover.

In step S34, the handover processing unit 22 of the source base station 11 receives, from the destination base station 12, the call admission control result that indicates that the call admission is permitted.

In step S35, the learning processing unit 23 of the source base station 11 performs the learning process on an applicability.

In step S36, the handover processing unit 22 of the source base station 11 specifies, as the handover destination base station, the destination base station 12 that permits the call admission, and the handover processing unit 22 of the source base station 11 instructs the mobile station 16 to perform the handover (or transmits the HO command to the mobile station 16).

Next, the learning process (illustrated in the flowchart of FIG. 7) that is performed on the applicability is described. In step S48 illustrated in FIG. 7, the learning processing unit 23 of the source base station 11 determines whether or not the applicability of the learning result is lower than a threshold (threshold for the applicability). It is considered that the threshold for the applicability is in a range of approximately 50% to 90%. When the applicability is not lower than the threshold, the current learning result is maintained, and learning process proceeds to step S47 of determining whether or not the next aging timer has expired. When the applicability is lower than the threshold, a learning requirement is changed in step S49 and the relearning starts.

The applicability is an index that indicates how accurately the destination base station determines, in accordance with the learning result, that the load of the destination base station is high. For example, when the applicability is calculated on the basis of the result of the call admission control, the source base station determines, in accordance with the learning result, that the load of the destination base station is low, and the source base station transmits a handover request and receives a response indicating that the call admission is rejected, the applicability (=the number of responses indicating that the call admission is permitted/(the number of the responses indicating that the call admission is permitted)+ (the number of responses indicating that the call admission is rejected)) is reduced. On the other hand, when the source base station receives a response indicating that the call admission is permitted, the applicability is increased. In step S35 illustrated in FIG. 6B, the applicability is increased since the source base station receives the response indicating that the call admission is permitted.

In step S49, the learning processing unit 23 of the source base station 11 changes the learning requirement and the relearning starts. In step S43, the learning processing unit 23 of the source base station 11 determines whether or not the load information elements (other than the wireless resource usage (obtained during the call admission control) of the guaranteed bit rate call of the destination base station) are all equal to or lower than the threshold. The learning requirement is the threshold used in step S43, for example. When the other information elements are larger than the threshold, an entry is not added to the learning table. Thus, the threshold can be used as the learning requirement. The reason to change the learning requirement is that the applicability is low due to the fact that the learning processing unit 23 misidentifies that the wireless resource usage of the guaranteed bit rate call causes the rejection of the call admission regardless of the fact that any of the load information elements other than the wireless resource usage of the guaranteed bit rate call causes the rejection of the call admission since the current threshold is high. Thus, the threshold that is the learning requirement is reduced, and the relearning is performed. The threshold (threshold for the applicability) that is compared with the applicability may be set by the designer of the system.

When the applicability is equal to or lower than the interested threshold, the learning processing unit 23 of the source base station 11 may perform the relearning without changing the learning requirement. There is a possibility that a low applicability may not be caused by an inappropriate learning requirement and may be caused by a change in a setting or implementation of the destination base station. In this case, it is not necessary to change the learning requirement. Whether or not to change the learning requirement may be set by the designer of the system in accordance with an operational policy of a network to be introduced.

In this manner, the learning processing unit 23 of the source base station 11 can learn which load level the destination base station determines as a high load. Then, the source base station can select, on the basis of learning results, a base station that will receive a load. In addition, the source base station can change a handover parameter relating to the selected base station and distribute the load. Furthermore, since the source base station does not transmit, on the basis of the learning results, the handover request to a high-load base station that will reject the call admission, and it is possible to reduce an overhead of the process of transmitting and receiving a message relating to the call admission control.

Second Embodiment

Figure 9:
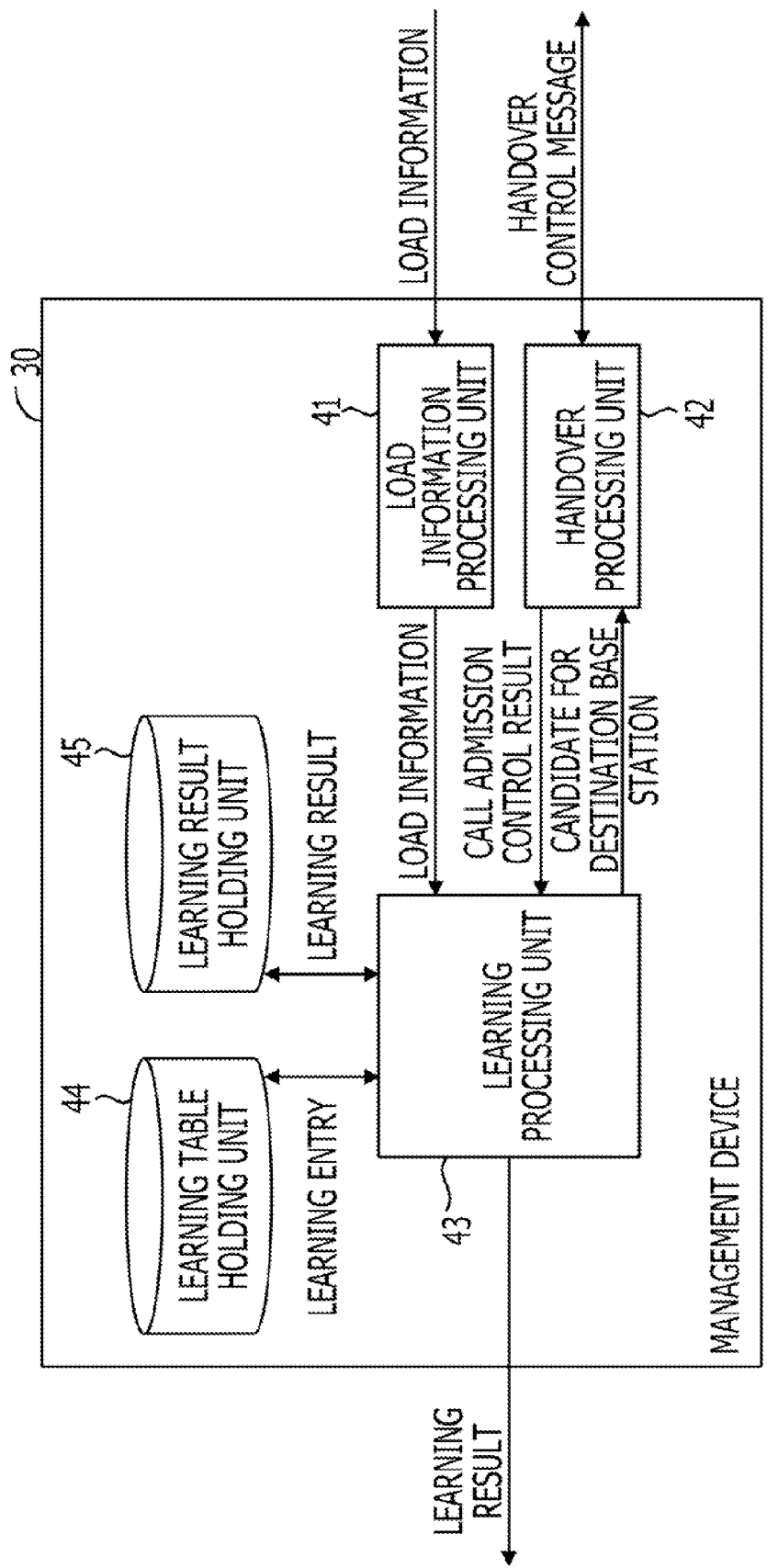
FIG. 9 is a diagram illustrating a wireless communication system according to a second embodiment.

In a second embodiment, the learning process is performed by a management device, unlike the first embodiment. FIG. 9 is a diagram illustrating a configuration of a wireless communication system according to the second embodiment. In FIG. 9, the management device 30 is generally called an element management system (EMS) or a network management system (NMS). The management device 30 receives load information of a source base station 31, load information of a destination base station 32 and load information of a destination base station 33. The management device 30 receives a call admission control result from the source base station 31, and learns loaded states of the destination base stations 32 and 33 that determine that loads of the destination base stations 32 and 33 are high. The management device 30 requests the base stations to change handover parameters in order to balance loads. A manufacturer of the management device 30, a manufacturer of the source base station 31, a manufacturer of the destination base station 32 and a manufacturer of the destination base station 33 are different from each other. For example, the mobile stations 15, 16 and the like are wirelessly connected to the source base station 31, while the mobile stations 17 and the like are wirelessly connected to the destination base station 32.

Figure 10:
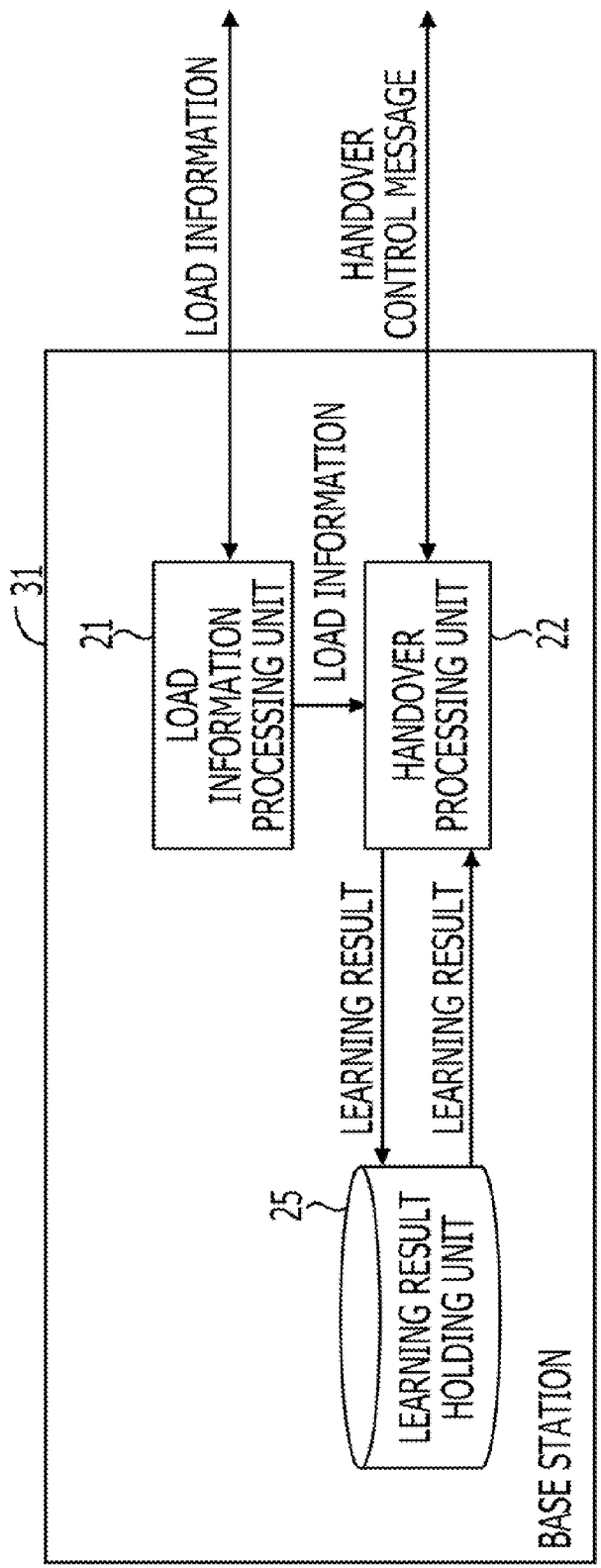
FIG. 10 is a block diagram illustrating a management device according to the second embodiment.

FIG. 10 is a block diagram illustrating the management device 30 according to the second embodiment. The management device 30 includes a load information processing unit 41, a handover processing unit 42, a learning processing unit 43, a learning table holding unit 44 and a learning result holding unit 45.

The load information processing unit 41 receives load information. The handover processing unit 42 changes a handover parameter, receives the results of the call admission control, and the like. The learning processing unit 43 learns a loaded state of a destination base station on the basis of the result of the call admission control and load information (of the destination base station) obtained during the call admission control. The learning table holding unit 44 holds the result of the call admission control and the load information (of the destination base station) obtained during the call admission control. The learning result holding unit 45 holds the result of learning a loaded state of a destination base station that determines that a load of the destination base station is high.

Figure 11:
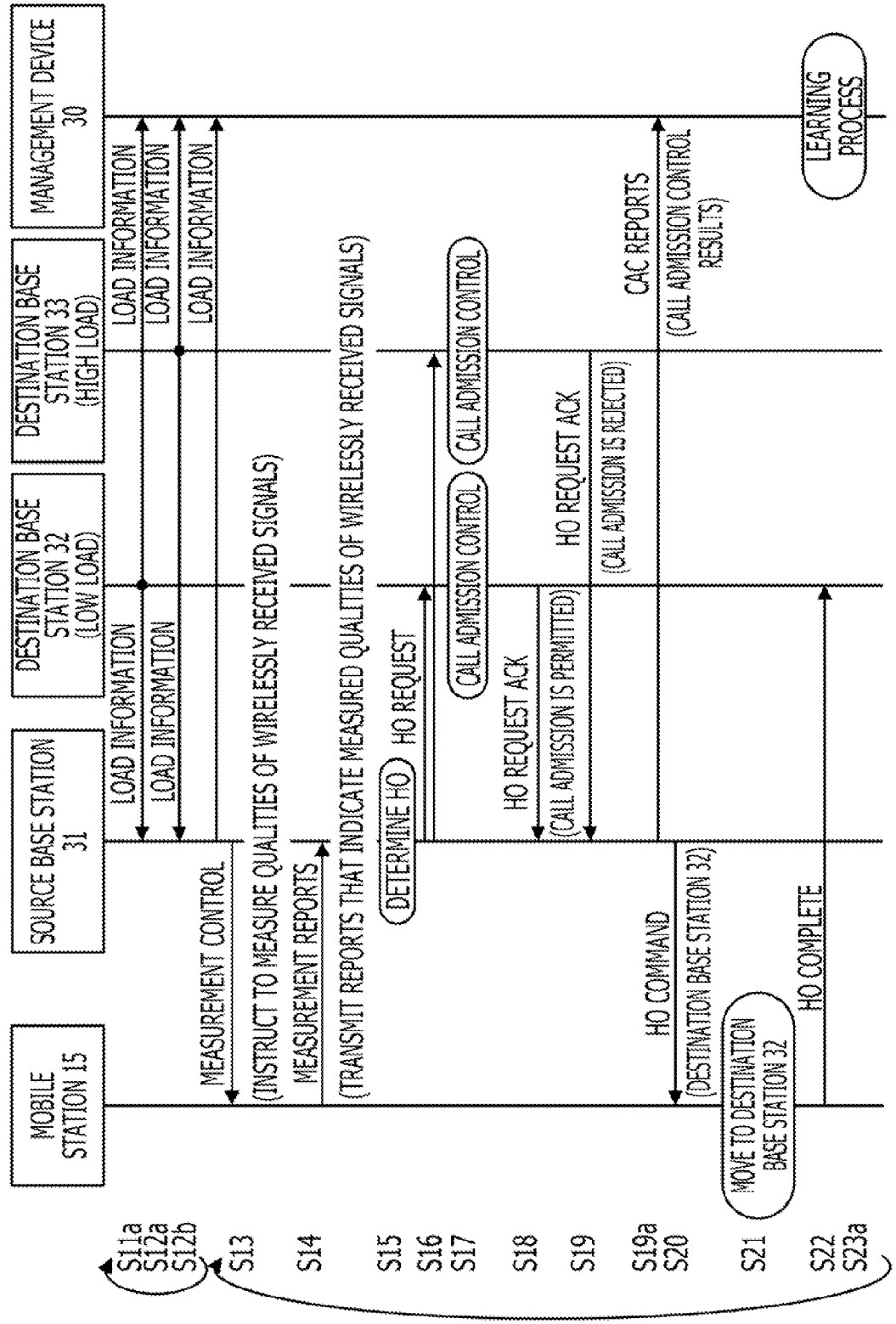
FIG. 11 is a block diagram illustrating a source base station according to the second embodiment.

FIG. 11 is a block diagram illustrating the source base station 31 according to the second embodiment. The source base station 31 includes the load information processing unit 21, the handover processing unit 22 and the learning result holding unit 25. The load information processing unit 21 generates load information and transmits the load information. In addition, the load information processing unit 21 receives load information. The handover processing unit 22 changes the handover parameter, transmits a handover request, performs the call admission control, and the like. The learning result holding unit 25 holds the result of learning a loaded state of a destination base station that determines that a load of the destination base station is high. The destination base station 32 and the destination base station 33 each have the same configuration as the source base station 31.

Figure 12:
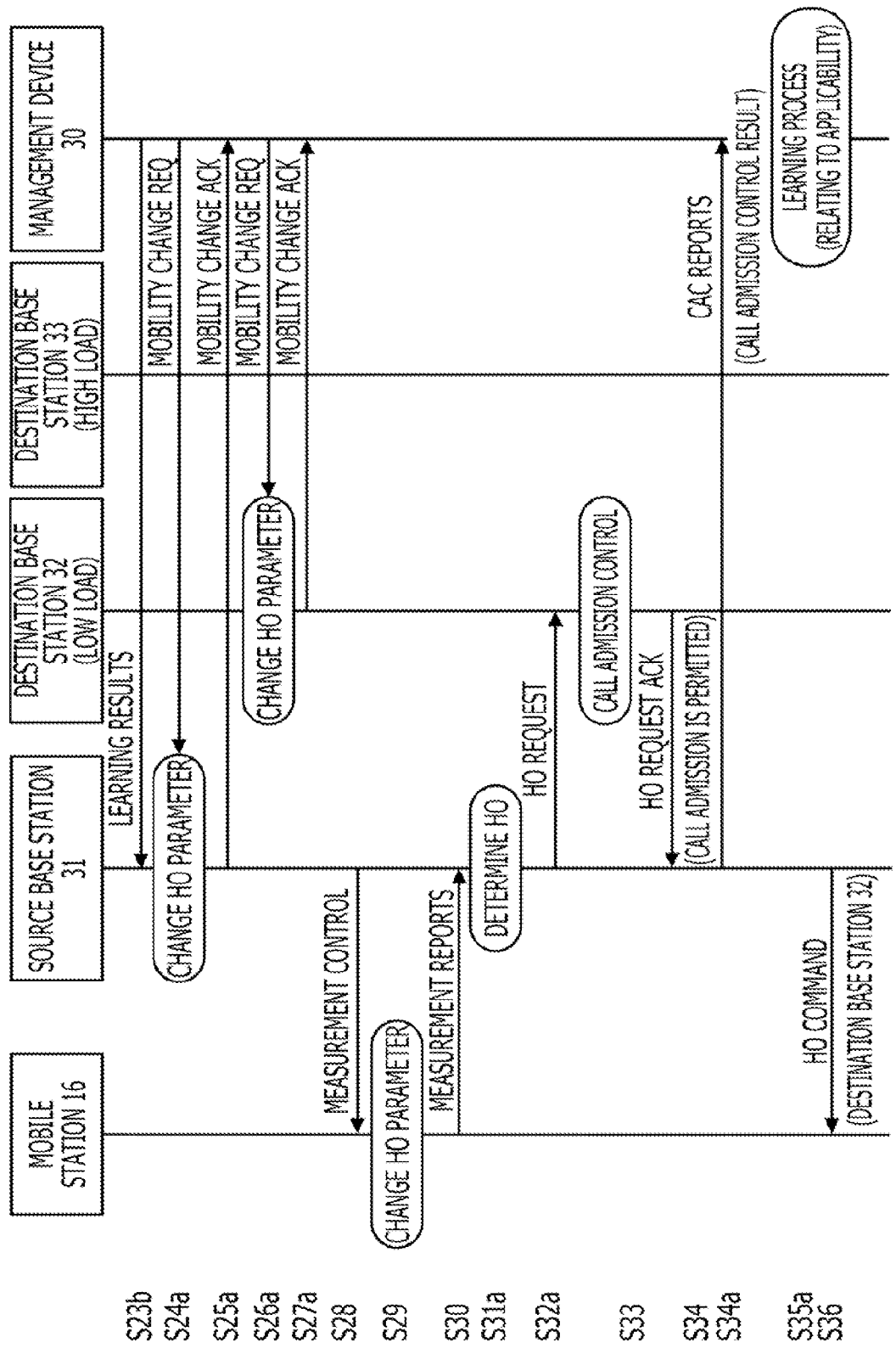
FIG. 12A is a call flow diagram illustrating a process to be performed by the wireless communication system according to the second embodiment.
FIG. 12B is a call flow diagram illustrating the process to be performed by the wireless communication system according to the second embodiment.

FIGS. 12A and 12B are call flow diagrams of a process to be performed by the wireless communication system according to the second embodiment. In FIGS. 12A and 12B, parts that are the same as the parts illustrated in FIGS. 6A and 6B are indicated by the same signs. The process according to the second embodiment is described below.

In steps S11a, S12a and S12b, the load information processing unit 41 of the management device 30 receives load information from the source base station 31, the destination base station 32 and the destination base station 33. The load information processing unit 21 of the source base station 31 receives load information from the destination base station 32 and the destination base station 33. The load information includes a plurality of information elements such as wireless resource usage of a guaranteed bit rate call, wireless resource usage of a best-effort call, wireless resource usage of all calls, a hardware load indicator and a wired load indicator, for example. The load information processing unit 41 of the management device 30 periodically and repeatedly receives the aforementioned load information.

In step S13, the handover processing unit 22 of the source base station 31 transmits a measurement control message to the mobile station 15 belonging to the source base station 31 and instructs the mobile station 15 to measure the qualities of signals wirelessly received from base stations. In this case, the source base station 31 transmits an offset value to the mobile station 15 using the measurement control message. The offset value is a handover parameter.

In step S14, the mobile station 15 measures the qualities of the signals wirelessly received from the base stations, and transmits, as the measurement results to the source base station 31, measurement reports that indicate destination base stations from which the measurement results that satisfy a measurement report requirement is obtained. The measurement report requirement is that the quality of the signal wirelessly received from a destination base station>the quality of a signal wirelessly received from the source base station+the offset value. In this example, the destination base station 32 and the destination base station 33 are reported as the measurement results.

In step S15, the handover processing unit 22 of the source base station 31 that receives the reports specifies the destination base station 32 and the destination base station 33 as candidates for a handover destination base station.

In step S16, the handover processing unit 22 of the source base station 31 transmits handover requests (HO requests) to the destination base stations 32 and 33 that are the candidates for the handover destination base station. Steps S16 to S19 indicate procedures of the call admission control. In step S17, the destination base station 32 and the destination base station 33 perform the call admission control for handover.

In step S18, the handover processing unit 22 of the source base station 31 receives, from the destination base station 32, a call admission control result that indicates that the call admission is permitted. In step S19, the handover processing unit 22 of the source base station 31 receives, from the destination base station 33, a call admission control result that indicates that the call admission is rejected.

In step S19a, the handover processing unit 42 of the management device 30 receives the call admission control results (CAC reports) from the handover processing unit 22 of the source base station 31. The contents of the call admission control results indicate that the call admission control result that indicates the call admission is permitted is received from the destination base station 32 and that the call admission control result that indicates the call admission is rejected is received from the destination base station 33.

In step S20, the handover processing unit 22 of the source base station 31 specifies the destination base station 32 (that permits the call admission) as a handover destination base station, and transmits a handover command (HO command) to the mobile station 15.

In steps S21 and S22, the mobile station 15 performs handover to the specified destination base station 32.

In step S23a, the learning processing unit 43 of the management device 30 combines the results (acquired from the handover processing unit 42) of the call admission control with the load information (obtained during the call admission control and acquired from the load information processing unit 41) of the destination base stations, stores the combined information for a certain time period, and learns, from the stored information, a loaded state of a destination base station that determines that a load of the destination base station is high. The learning process that is performed by the learning processing unit 43 of the management device 30 is the same as the learning process illustrated in the flowchart of FIG. 7.

In step S23b illustrated in FIG. 12B, the learning processing unit 43 of the management device 30 transmits learning results to the handover processing unit 22 of the source base station 31. The handover processing unit 22 of the source base station 31 causes the received learning results to be stored in the learning result holding unit 25 of the source base station 31.

Since the handover processing unit 42 of the management device 30 detects that the load of the source base station 31 is high, the source base station 31 and the destination base station 32 change the handover parameters so that loads are distributed to another base station in order to balance loads in steps S24a to S27a. The handover processing unit 42 of the management device 30 detects, on the basis of the load information received from the source base station 31 and the learning result relating to the source base station 31, that the load of the source base station 31 is high. For a mobile station that will perform handover to the source base station 31, the source base station 31 is a destination base station. The management device 30 also performs the learning process on the source base station 31. In the process of balancing loads, it is assumed that the learning processing unit 43 of the management device 30 has already learned that the destination base station 32 determines that the load of the destination base station 32 is low and the destination base station 33 determines that the load of the destination base station is high.

The handover processing unit 42 of the management device 30 receives, from the learning processing unit 43, information that specifies the destination base station 32 as a candidate for a handover destination base station and excludes the destination base station 33 that determines that the load of the destination base station 33 is high. The management device 30 specifies the destination base station 32 as a base station that will receive a load. The management device 30 changes a handover parameter so as to prompt the mobile station to perform handover from the source base station 31 to the destination base station 32.

In step S24a, the handover processing unit 42 of the management device 30 transmits a request (mobility change request) to the source base station 31 so as to request the source base station 31 to change the handover parameter, and the handover processing unit 22 of the source base station 31 changes the handover parameter. In step S25a, the handover processing unit 22 of the source base station 31 transmits a change acknowledge (mobility change acknowledge) message to the handover processing unit 42 of the management device 30. A method for changing an offset value that is the handover parameter is performed in the same manner as the first embodiment.

In steps S26a and S27a, the handover processing unit 42 of the management device 30 changes a handover parameter provided for the destination base station 32 so as to suppress handover from the destination base station 32 to the source base station 31. A method for changing an offset value that is the handover parameter is performed in the same manner as the first embodiment.

In step S28, the handover processing unit 22 of the source base station 31 transmits the changed handover parameter or the changed offset value to the mobile station 16 that belongs to the source base station 31 (measurement control).

In step S29, the mobile station 16 changes the handover parameter of the mobile station 16. Thus, the mobile station 16 can readily perform handover from the source base station 31 to the destination base station 32.

In the same procedures as steps S28 and S29, the destination base station 32 transmits the changed handover parameter or the changed offset value to the mobile station 17 belonging to the destination base station 32, and the mobile station 17 changes the handover parameter of the mobile station 17. Since the mobile station 17 changes the handover parameter of the mobile station 17, it becomes difficult for the mobile station 17 (belonging to the destination base station 32) to perform handover from the destination base station 32 to the source base station 31.

In step S30, the mobile station 16 measures the qualities of signals wirelessly received from the base stations, and transmits, as the measurement results to the source base station 31, measurement reports that indicate destination base stations from which the measurement results that satisfy a measurement report requirement is obtained. The measurement report requirement is that the quality of the signal wirelessly received from a destination base station>the quality of a signal wirelessly received from the source base station+the offset value.

In step S31$a$, the handover processing unit 22 of the source base station 31 determines the source base station 32 as a candidate for a handover destination base station on the basis of the learning result received from the learning result holding unit 25 and the current load information received from the load information processing unit 21, while excluding, from candidates for the handover destination base station, the destination base station 33 that determines that the load of the destination base station 33 is high. In step S32$a$, the handover processing unit 22 of the source base station 31 transmits a handover request relating to the mobile station 16 to the destination base station 32.

In step S33, the destination base station 32 performs the call admission control for the handover.

In step S34, the handover processing unit 22 of the source base station 31 receives, from the destination base station 32, a call admission control result that indicates that the call admission is permitted.

In step S34$a$, the handover processing unit 42 of the management device 30 receives a call admission control result (CAC report) from the handover processing unit 22 of the source base station 31. The content of the call admission control result (CAC report) indicates that the call admission control result indicating that the call admission is permitted has been received from the destination base station 32.

In step S35$a$, the learning processing unit 43 of the management device 30 uses the call admission control result acquired from the handover processing unit 42 and performs the learning process on the applicability. Details of the learning process to be performed on the applicability are the same as the first embodiment.

In step S36, the handover processing unit 22 of the source base station 31 specifies the destination base station 32 (that permits the call admission) as the handover destination base station, transmits a handover command (HO command) to the mobile station 16 and instructs the mobile station 16 to perform handover from the source base station 31 to the destination base station 32.

In this manner, it is possible to learn which load level the destination base station determines as a high load. In addition, it is possible to select, on the basis of the learning result, a base station that will receive a load. Furthermore, it is possible to change a handover parameter of the selected base station and balance loads. In addition, the handover request is not transmitted to a high-load base station that will reject the call admission on the basis of the learning result. Thus, it is possible to reduce an overhead of the process of transmitting and receiving a message relating to the call admission control.

Third Embodiment

In a third embodiment, as a remaining time of the aging timer is shorter, a higher probability of transmitting a handover request is determined; and as the determined probability of transmitting the handover request is higher, the handover request is transmitted with a higher probability. This is due to the fact that as the remaining time of the aging timer is shorter, the validity of the learning result is reduced. This process is effective when an information element (of the load information) to be learned is the wireless resource usage of the best-effort call.

For example, when the number of mobile stations that belong to a destination base station is large, the wireless resource usage of the best-effort call is high, and a call admission is rejected, the source base station performs the learning process so that the source base station does not transmit the handover request to the destination base station whose wireless resource usage of the best-effort call is high. After that, when the number of mobile stations that belong to the destination base station is reduced and the wireless resource usage of the best-effort call is high, there is a possibility that the destination base station may admit a mobile station. In this case, the call is the best-effort call. Thus, when the number of mobile stations is small and a bandwidth to be used per mobile station is reduced, the destination base station can further admit a mobile station.

As described above, the source base station performs the learning process so that the source base station does not transmit the handover request to a destination base station whose wireless resource usage of a best-effort call is high. Thus, the source base station does not transmit the handover request to the destination base station. This means that resources of base stations included in the system are not effectively used.

In such a case, when the source base station performs the learning process so that the source base station does not transmit the handover request, it is possible to alleviate the problem (that the resources of the base stations are not effectively used) by increasing the probability of transmitting the handover request to an extent. To increase the probability of transmitting the handover request to an extent, it is considered that as the remaining time of the aging timer is shorter, a higher probability of transmitting the handover request is determined, and as the determined probability of transmitting the handover request is higher, the handover request is transmitted with a higher probability. This process is not limited to the wireless resource usage of the best-effort call. The process of increasing the probability of transmitting the handover request to an extent is valid for any of the other information elements of the load information, instead of the wireless resource usage of the best-effort call.

In the first embodiment, if the aging timer has expired, the relearning is performed. Once the learning result is calculated and a setting or implementation of the destination base station is changed, the learning result is not valid. Thus, the relearning is performed. It can be considered that the probability that the learning result becomes invalid is gradually higher as the time elapses, instead of the fact that whether the learning result is valid or invalid is determined by determining whether or not the aging timer has expired. Thus, the probability of transmitting the handover request is set to a value that gradually increases as the time of the aging timer becomes to zero.

In the first embodiment, the handover processing unit 22 of the source base station 11 performs the process of transmitting the handover request in steps S31 and S32 after the learning process. In the third embodiment, the process of steps S31 and S32 is changed.

Figure 13:
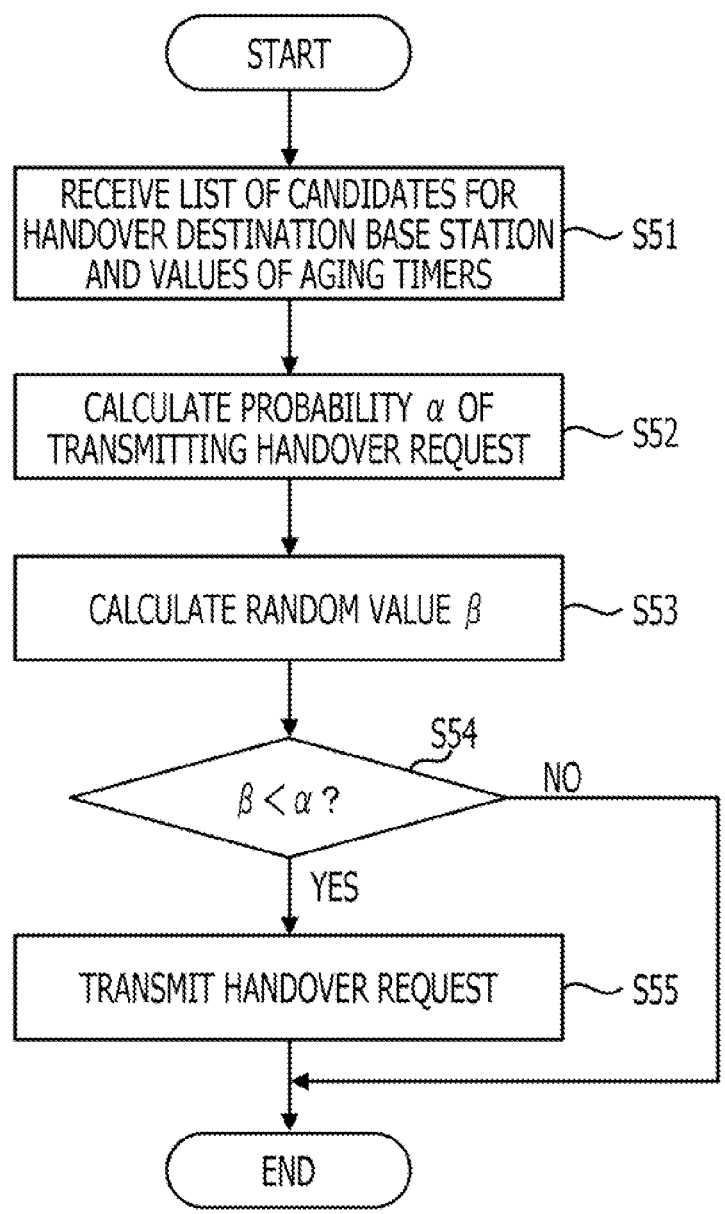
FIG. 13 is a flowchart of a handover request transmission process according to a third embodiment.

FIG. 13 is a flowchart of a handover request transmission process according to the third embodiment. The handover request transmission process according to the third embodiment is performed by the handover processing unit 22 of the source base station 11. In FIG. 13, in step S51, the handover processing unit 22 receives a list of candidates for a handover destination base station and the current values of aging timers that are related to the base stations indicated in the list. The candidates that are indicated in the list are a base station whose load is a high load and a destination base station whose load is lower by a certain value than the high load, while the loads of the base stations are based on the learning results received from the learning processing unit 23 and the load information from the learning processing unit 23. The handover processing unit 22 transmits, on the basis of the learning results and the load information, the handover request to a base station that is not the high-load base station and the base station whose load is lower by the certain value than the high load, as described in the first embodiment.

In step S52, the handover processing unit 22 calculates a probability α of transmitting the handover request according to the following equation.

α=(an initial value of the aging timer−the current value of the aging timer)/the initial value of the aging timer The probability α of transmitting the handover request is between 0 and 1. As the remaining time of the aging timer becomes shorter, the calculated probability of transmitting the handover request becomes higher.

In step S53, the handover processing unit 22 calculates a random value β.

In step S54, the handover processing unit 22 determines whether or not the random value β is smaller than the probability α of transmitting the handover request. When the random value β is smaller than the probability α of transmitting the handover request, the handover processing unit 22 transmits the handover request to the interested destination base station in step S55. When the random value β is not smaller than the probability α of transmitting the handover request, the handover processing unit 22 does not transmit the handover request to the interested destination base station.

Thus, when the source base station performs the learning process so that the source base station does not transmit the handover request to a certain base station, it is possible to alleviate the problem (that the resources of the base stations are not effectively used) by increasing the probability of transmitting the handover request to an extent.

Fourth Embodiment

In a fourth embodiment, when a destination base station transmits the result of the call admission control to the source base station, the destination base station also transmits load information of the destination base station to the source base station, unlike the first and second embodiments.

Figure 14:
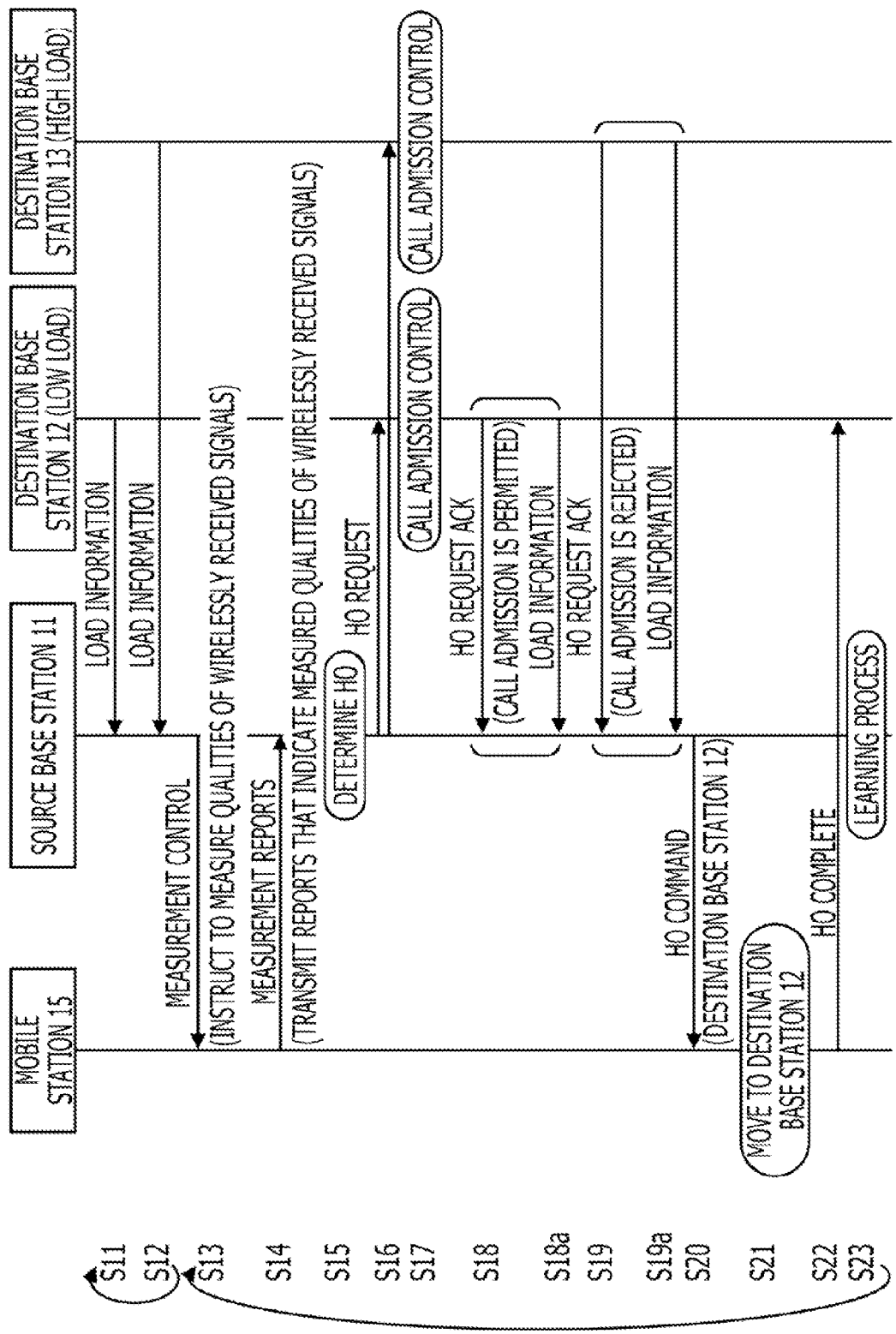
FIG. 14 is a call flow diagram illustrating a process according to a fourth embodiment.

FIG. 14 is a call flow diagram illustrating a process according to the fourth embodiment, while the process is performed in the case where the source base station performs the learning process. In FIG. 14, parts that are the same as the parts illustrated in FIG. 6A are indicated by the same signs. Parts of the process (illustrated in FIG. 14) according to the fourth embodiment, which are different from the first embodiment, are described below.

In FIG. 14, in steps S18 and S18a, the destination base station 12 transmits the result of the call admission control and the current load information of the destination base station 12 to the source base station 11.

In steps S19 and S19a, the destination base station 13 transmits the result of the call admission control and the current load information of the destination base station 13 to the source base station 11.

In step S23, the source base station 11 combines the results of the call admission control with the load information (obtained during the call admission control) of the destination base stations, and stores the combined information. The source base station 11 learns, from the stored information, a loaded state of a destination base station that determines that a load of the destination base station is high.

Figure 15:
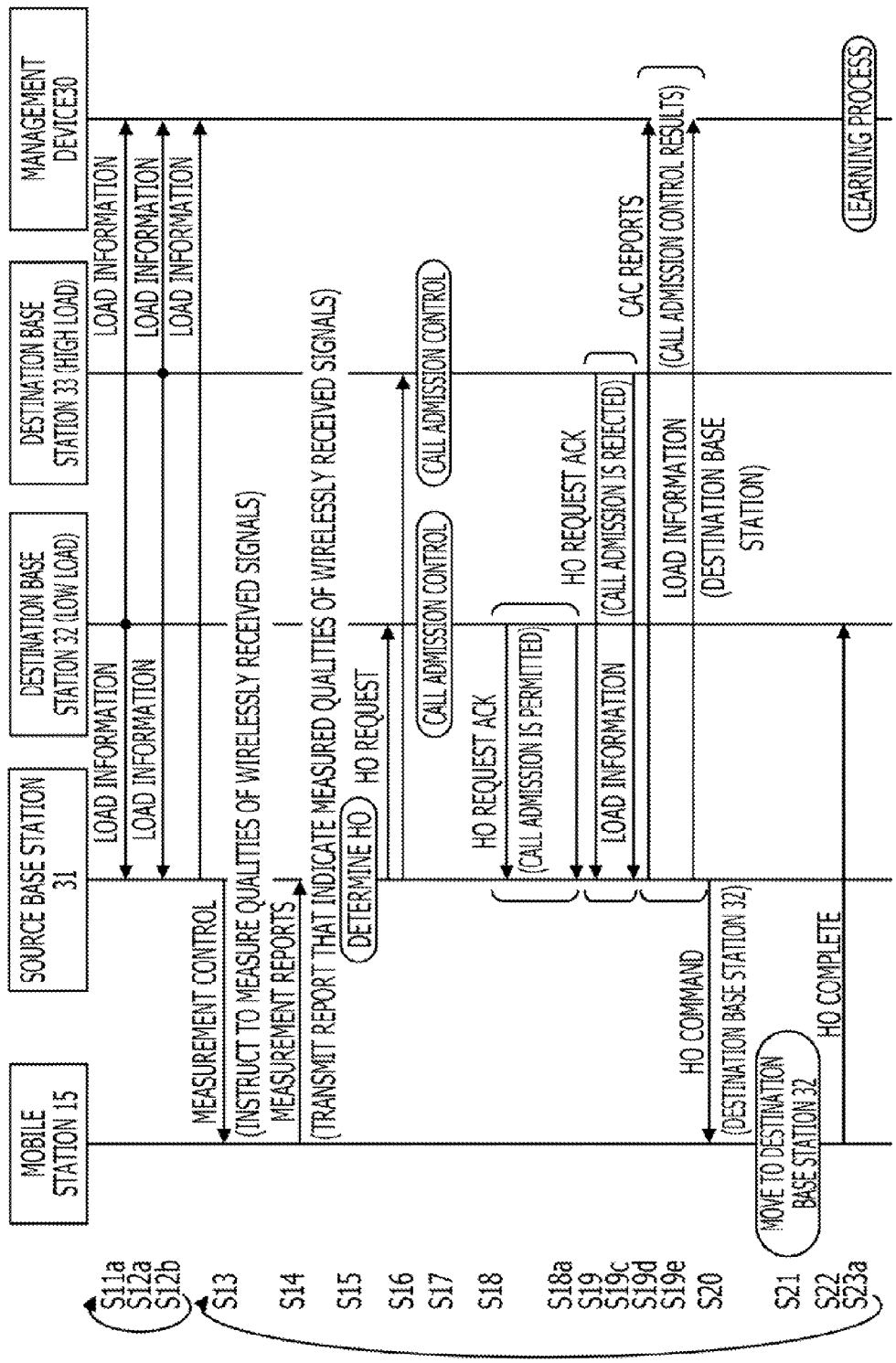
FIG. 15 is a call flow diagram illustrating a process according to the fourth embodiment.

FIG. 15 is a call flow diagram illustrating a process according to the fourth embodiment, while the process is performed in the case where the source base station performs the learning process. In FIG. 15, parts that are the same as the parts illustrated in FIG. 12A are indicated by the same signs. Parts of the process (illustrated in FIG. 15) according to the fourth embodiment, which are different from the second embodiment, are mainly described below.

In FIG. 15, in steps S18 and S18a, the destination base station 32 transmits the result of the call admission control and the current load information of the destination base station 32 to the source base station 31.

In steps S19 and S19c, the destination base station 33 transmits the result of the call admission control and the current load information of the destination base station 33 to the source base station 31.

In steps S19d and S19e, the source base station 31 transmits, to the management device 30, the call admission control results and the load information (received in steps S18a and S19c when the source base station 31 receives the call admission control results from the destination base station 32 and the destination base station 33) of the destination base stations 32 and 33. Thus, the load information that is transmitted to the management device 30 is not related to the source base station 31 and is related to the destination base station 32 and the destination base station 33.

In step S23a, the management device 30 combines the results of the call admission control with the load information (obtained during the call admission control) of the destination base stations and stores the combined information in the same manner as the second embodiment. The management device 30 learns, from the stored information, a loaded state of a destination base station that determines that a load of the destination base station is high.

Since the learning process is performed on the basis of the stored information obtained by combining the results of the call admission control with the load information (obtained during the call admission control) of the destination base stations, the load information is obtained during the call admission control, and the learning process can be more accurately performed.

Fifth Embodiment

In a fifth embodiment, the source base station transmits various load information pieces to each of destination base stations regardless of the loaded state of the source base station, the destination base stations each store, for a certain time period, information that indicates whether or not the destination base station transmits the handover request to the source base station, and the source base station estimates and learns, on the basis of the stored information, a loaded state of a destination base station that determines that a load of the other destination base station is high.

In the first embodiment, it is necessary to wait for the handover request to be permitted or rejected until various loaded states of a destination base station are accumulated to a certain extent. On the other hand, the source base station actively transmits the various load information pieces to each of the destination base stations regardless of the loaded state of the source base station. Then, the source base station confirms whether or not responses to the transmitted load information pieces are transmitted from the destination base stations, or confirms whether or not the handover requests are transmitted from the destination base stations, and whereby the source base station can accumulate behaviors of the destination base stations for loaded states for a short time period.

When the destination base station receives a certain load and does not transmit the handover request to the source base station on the basis of the received load, it can be estimated that the destination base station determines that the received load is high for (the loaded state of) the destination base station.

The configuration of a network according to the fifth embodiment is the same as the configuration (illustrated in FIG. 4) of the network according to the first embodiment.

Figure 16:
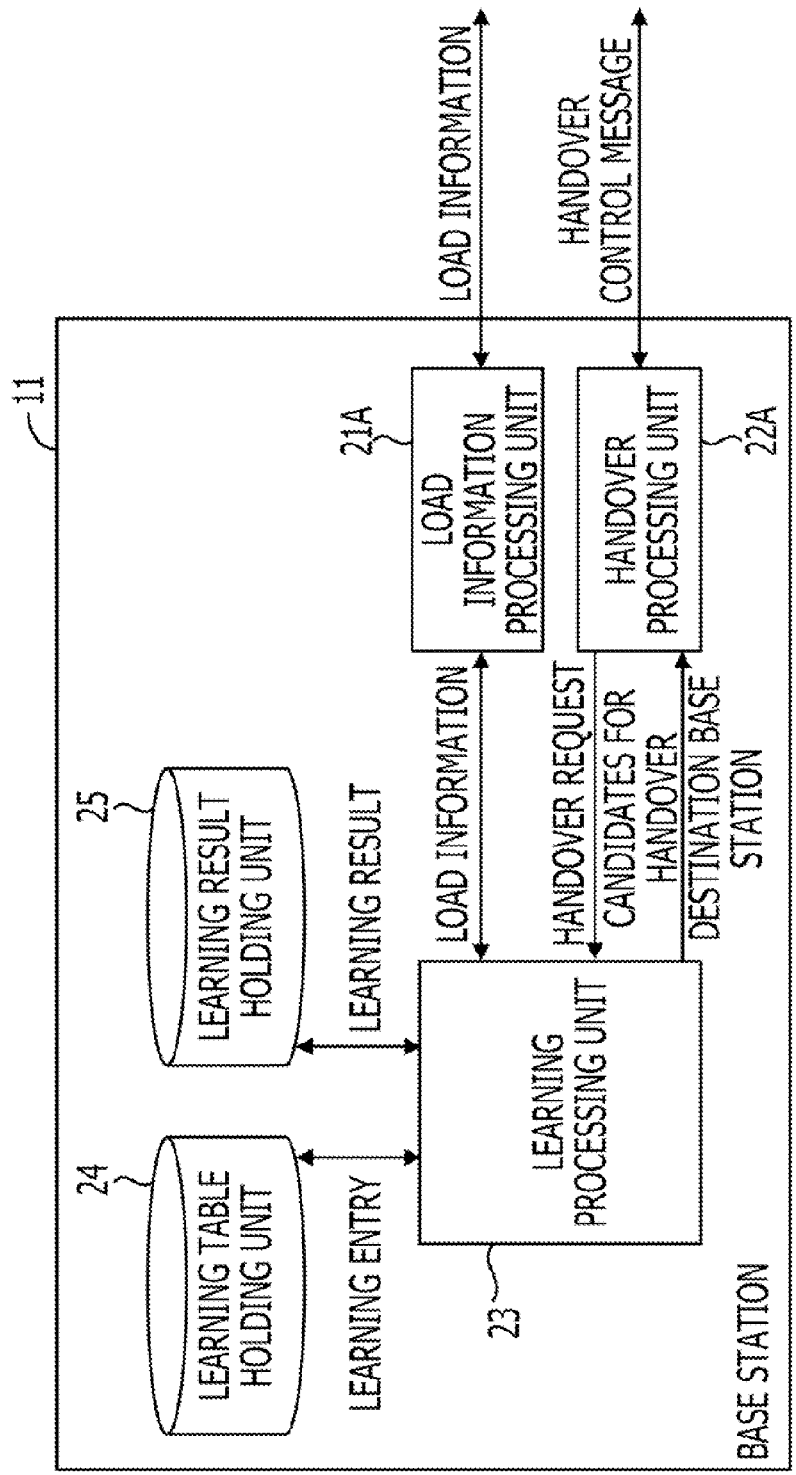
FIG. 16 is a block diagram illustrating a source base station according to a fifth embodiment.

FIG. 16 is a block diagram illustrating the source base station 11 according to the fifth embodiment. The source base station 11 includes a load information processing unit 21A, a handover processing unit 22A, the learning processing unit 23, the learning table holding unit 24 and the learning result holding unit 25.

The load information processing unit 21A generates load information and transmits the load information. In addition, the load information processing unit 21A receives load information. The handover processing unit 22A changes a handover parameter, supplies a handover request to the learning processing unit 23, performs the call admission control, and the like. The handover processing unit 22 illustrated in FIG. 5 supplies the call admission control result to the learning processing unit 23. On the other hand, the handover processing unit 22A supplies the handover request to the learning processing unit 23.

The learning processing unit 23 learns the loaded state of the source base station on the basis of the handover request and load information. The learning table holding unit 24 holds information indicating whether or not a handover request is received; and the load information (of the source base station) that is the same information as the load information that is transmitted from the source base station to the destination base stations. The learning result holding unit 25 holds a learning result calculated from loaded states of a destination base station that determines that a load of the destination base station is high. The destination base stations 12 and 13 each have the same parts as the source base station 11.

Figure 17:
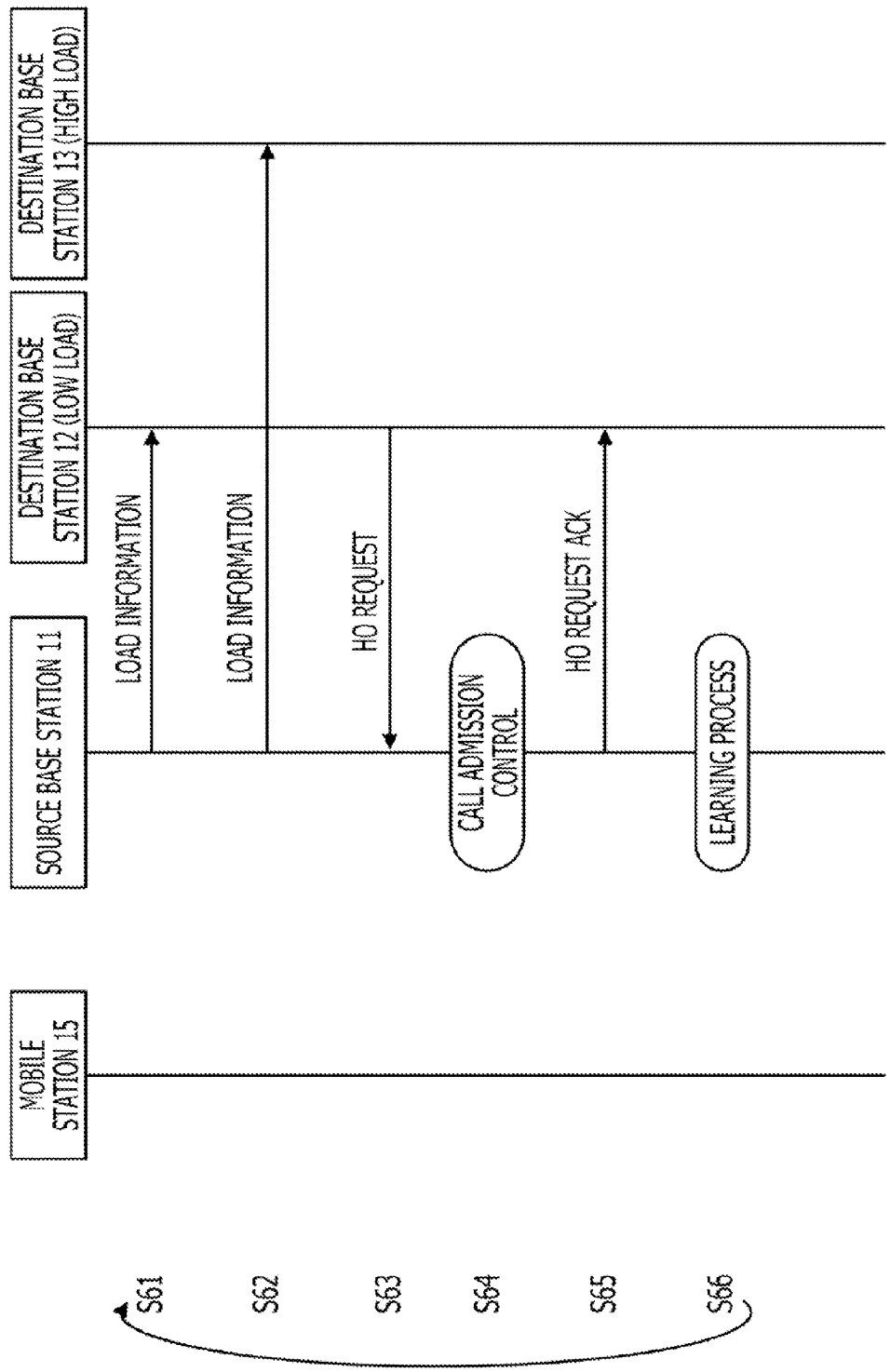
FIG. 17 is a call flow diagram illustrating a process to be performed by a wireless communication system according to the fifth embodiment.

FIG. 17 is a call flow diagram illustrating a process to be performed by a wireless communication system according to the fifth embodiment. In FIG. 17, in steps S61 and S62, the load information processing unit 21A of the source base station 11 transmits load information pieces to the destination base station 12 and the destination base station 13. In this case, the source base station 11 transmits the various load information pieces to each of the destination base stations 12 and 13 regardless of the loaded state of the source base station 11 in order to confirm responses that are transmitted from the destination base stations.

In step S63, the destination base station 12 transmits a handover request to the handover processing unit 22A of the source base station 11. On the other hand, the destination base station 13 does not transmit a handover request. In this case, the source base station 11 can estimate that the destination base station 13 determines that the load information pieces transmitted in step S62 indicate high loads.

In step S64, the source base station 11 performs the call admission control. In step S65, the source base station 11 transmits a call admission control result (HO request acknowledge) to the destination base station 12.

In step S66, the learning processing unit 23 of the source base station 11 performs a learning process.

The load information processing unit 21A of the source base station 11 confirms responses (to certain load information) transmitted from the destination base stations 12 and 13, acquires other load information from the learning processing unit 32, and confirms responses (to the other load information) transmitted from the destination base stations 12 and 13.

Figure 18:
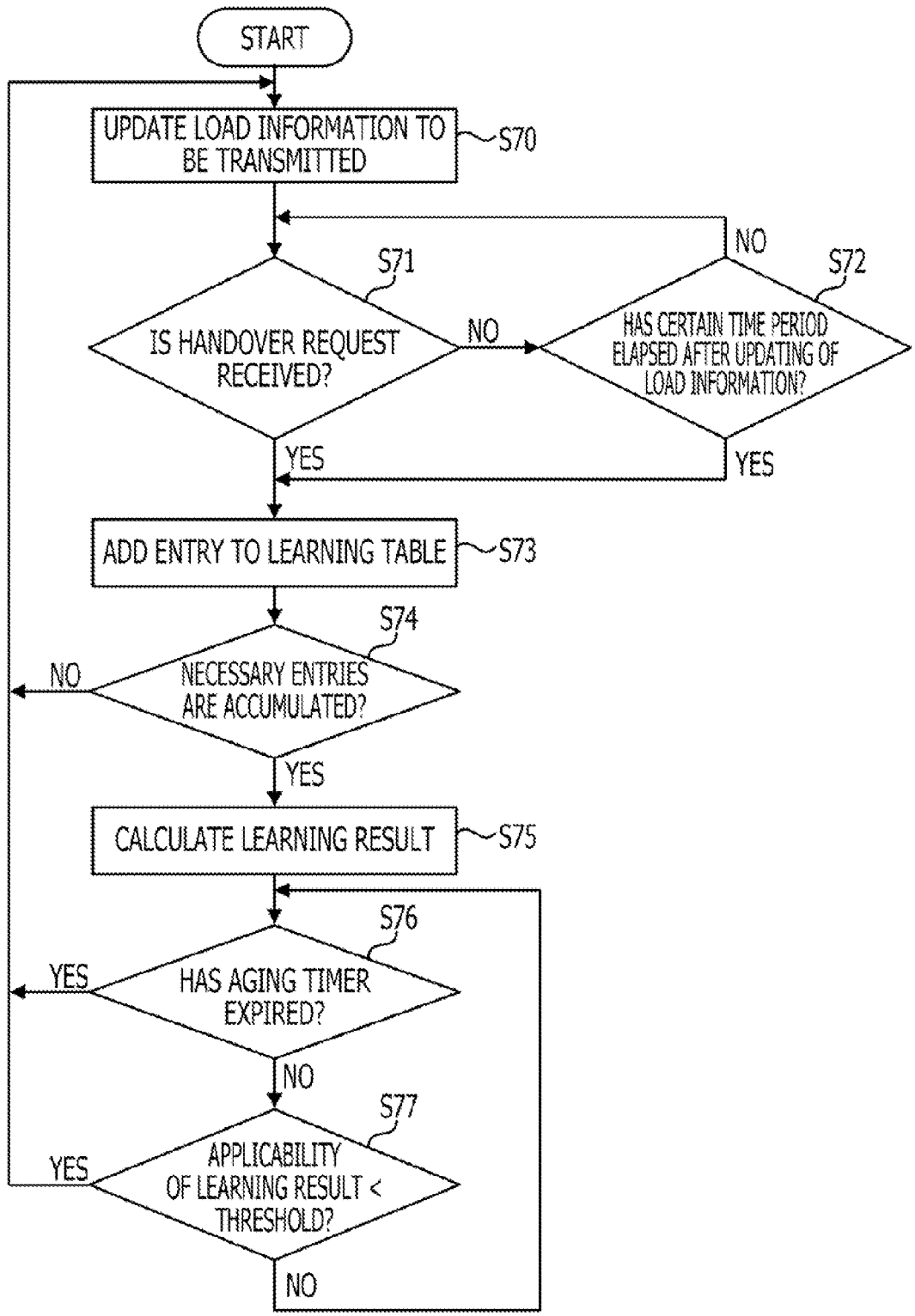
FIG. 18 is a flowchart of a learning process according to the fifth embodiment.

FIG. 18 is a flowchart of the learning process according to the fifth embodiment. The learning process is performed by the learning processing unit 23 of the source base station 11. In FIG. 18, in step S70, the learning processing unit 23 of the source base station 11 updates load information to be transmitted.

In step S71, the learning processing unit 23 of the source base station 11 confirms, on the basis of information received from the handover processing unit 22A, whether or not the learning processing unit 23 of the source base station 11 receives a handover request from a destination base station. When the learning processing unit 23 of the source base station 11 receives the handover request, the learning processing unit 23 adds an entry to the learning table of the learning table holding unit 24 in step S73. When the learning processing unit 23 of the source base station 11 does not receive the handover request, the learning process proceeds to step S72.

In step S72, the learning processing unit 23 of the source base station 11 determines whether or not a certain time period (for example, several minutes) has elapsed after the updating of the load information to be transmitted to the destination base stations 12 and 13. If the certain time period has elapsed after the updating, the learning processing unit 23 adds an entry to the learning table in step S73. If the certain time period has yet to elapse after the updating, the learning process proceeds to step S71 in order to reconfirm whether or not the learning processing unit 23 receives the handover request. The certain time period may be set by the designer of the system during the design of the system.

In step S73, the learning processing unit 23 of the source base station 11 adds an entry to the learning table of the learning table holding unit 24. The configuration of the learning table is illustrated in FIG. 19A. The learning table includes an item of a time stamp, an item of wireless resource usage of a guaranteed bit rate call of the source base station and an item of reception of the handover request.

The learning table holding unit 24 holds the learning table (illustrated in FIG. 19A) for each of the destination base stations. For example, it is assumed that the learning table illustrated in FIG. 19A is included in the source base station 11 and provided for the destination base station 12. For example, when the source base station 11 receives the handover request from the destination base station 12 at 10 o'clock, 42 minutes, 10 seconds and 100 milliseconds, and information that indicates wireless resource usage (of a guaranteed bit rate call) of 82% is transmitted to the destination base station 12 from the source base station 11, the learning processing unit 23 of the source base station 11 adds, to the learning table, an entry that represents that the time stamp indicates 10:42:10.100; the wireless resource usage of the guaranteed bit rate call indicates 82; and the reception of the handover request indicates "received". On the other hand, when the learning processing unit 23 of the source base station 11 does not receive the handover request after the certain time period has elapsed after the updating of the load information to be transmitted to the destination base stations 12 and 13, the learning processing unit 23 adds an entry that represents that the reception of the handover request indicates "not received".

In step S74, the learning processing unit 23 of the source base station 11 determines whether or not entries that are necessary to calculate a learning result are accumulated in the learning table. The learning processing unit 23 of the source base station 11 makes this determination by determining whether or not the learning processing unit 23 can find the wireless resource usage (of a guaranteed bit rate call) corresponding to "received" indicated in the item of reception of the handover request and the wireless resource usage (of a guaranteed bit rate call) corresponding to "not received" indicated in the item for the reception of the handover request.

When the learning processing unit 23 can find the wireless resource usage corresponding to "received" indicated in the item of reception of the handover request and the wireless resource usage corresponding to "not received" indicated in the item of reception of the handover request, the learning process proceeds to step S75 to calculate the learning result. When the learning processing unit 23 does not find the wireless resource usage corresponding to "received" indicated in the item of reception of the handover request and the wireless resource usage corresponding to "not received" indicated in the item of reception of the handover request, the learning process proceeds to step S70 so that the learning processing unit 23 updates the load information to be transmitted to the destination base stations 12 and 13 and repeatedly confirms whether or not the learning processing unit 23 receives the handover request.

In step S75, the learning processing unit 23 of the source base station 11 learns the loaded state of the destination base station from the information stored in the learning table of the learning table holding unit 24, and calculates the learning result. The learning processing unit 23 causes the learning result to be stored in the learning result holding unit 25. For example, when the learning table has the same contents as illustrated in FIG. 19A, the learning processing unit 23 calculates, at 10 o'clock, 42 minutes, 20 seconds and 0 milliseconds, a learning result that indicates that "when the wireless resource usage of the guaranteed bit rate call is 83% or higher, the destination base station 12 determines that the load is high", and the learning processing unit 23 causes the calculated learning result (illustrated in FIG. 19B) to be stored in the learning result holding unit 25.

This is due to the fact that the item of reception of the handover request, which corresponds to wireless resource usage (of a guaranteed bit rate call) of less than 83%, indicates "received" and that the item of reception of the handover request, which corresponds to wireless resource usage (of a guaranteed bit rate call) of 83% or higher, indicates "not received", according to the learning table illustrated in FIG. 19A. In addition, the learning processing unit 23 sets an aging timer to the learning result as illustrated in FIG. 19B, and activates the aging timer in order to start a countdown. In FIG. 19B, the aging timer is set for 10 minutes. An initial value of the aging timer may be set by the designer of the system during the design of the system. The learning result processing unit 25 counts a value that is indicated by the aging timer according to time passage.

In this example, the learning process procedures that are performed on the basis of the wireless resource usage of the guaranteed bit rate call are described. Learning tables that are the same as or similar to the learning table illustrated in FIG. 19A and are provided for the other information elements included in the load information can be held by the learning table holding unit 24. The learning processing unit 23 can perform learning process procedures (on each of the other information elements) that are the same as or similar to the learning process procedures illustrated in FIG. 18. Thus, the learning processing unit 23 can calculate such a learning result as illustrated in FIG. 9B for each of the other information elements.

In step S76, the learning processing unit 23 of the source base station 11 determines whether or not the aging timer has expired. When the value of the aging timer becomes 0, the aging timer expires. If the aging timer has expired, the learning process proceeds to step S70 so that relearning starts. If the aging timer has yet to expire, the learning process proceeds to step S77 so that the learning processing unit 23 determines whether or not the applicability of the learning result is lower than the interested threshold. When the applicability is lower than the threshold, the learning process proceeds to step S70. When the applicability is not lower than the threshold, the learning process proceeds to step S76.

In the fifth embodiment, the learning process can be performed at a higher speed. The fifth embodiment can be combined with any of the first to fourth embodiments so that the learning process is performed.

An example of a hardware configuration of each of the base stations is described. A wireless interface (IF) is an interface device that is used to perform wireless communication with a mobile station. A processor is a device that processes data. Examples of the processor are a central processing unit (CPU) and a digital signal processor (DSP). A memory is a device that stores data. Examples of the memory are a read only memory (ROM) and a random access memory (RAM). A logical circuit is an electronic circuit that performs a logical operation. Examples of the logical circuit are a large scale integration (LSI), a field-programming gate array (FPGA) and an application specific integrated circuit (ASIC). A wired IF is an interface device that is used to perform wired communication with another base station, the management device and the like, which are connected to a network (so-called backhaul network) located on the side of a network of a mobile phone system. The base stations may each use the wireless IF and perform wireless communication with another wireless base station and the like that are connected to the backhaul network.

Correspondence relationships between the base station illustrated in FIG. 5 and the hardware configuration are described as follows. The wireless IF corresponds to a part of the handover processing unit, for example. The processor and the logical circuit correspond to a part of the load information processing unit, a part of the handover processing unit and the learning processing unit, for example. The memory corresponds to the learning table holding unit and the learning result holding unit, for example. The wired IF corresponds to a part of the load information processing unit and a part of the handover processing unit, for example.

Correspondence relationships between the base station illustrated in FIG. 11 and the hardware configuration are described as follows. The wireless IF corresponds to a part of the handover processing unit, for example. The processor and the logical circuit correspond to a part of the load information processing unit and a part of the handover processing unit, for example. The memory corresponds to the learning result holding unit, for example. The wired IF corresponds to a part of the load information processing unit and a part of the handover processing unit, for example.

Correspondence relationships between the base station illustrated in FIG. 16 and the hard configuration are the same as the base station illustrated in FIG. 5.

An example of a hardware configuration of the management device according to the aforementioned embodiments is described as follows. A processor is a device that processes data. Examples of the processor are a CPU and a DSP. A memory is a device that stores data. Examples of the memory are a ROM and a RAM. An auxiliary memory is a device that stores data. An example of the auxiliary memory is a hard disk. The auxiliary memory may be replaced with or complemented by an external storage medium (such as a magnetic disk) and a device that reads or writes data from or in the external storage medium. A logical circuit is an electronic circuit that performs a logical operation. Examples of the logical circuit are an LSI, an FPGA and an ASIC. A wired IF is an interface device that is used to perform wired communication with another base station, the management device and the like, which are connected to a network (so-called backhaul network) located on the side of the network of the mobile phone system. The base stations may each use the wireless IF and perform wireless communication with another wireless base station and the like that are connected to the backhaul network.

Correspondence relationships between the management device illustrated in FIG. 10 and the hardware configuration are described as follows. The processor and the logical circuit correspond to a part of the load information processing unit, a part of the handover processing unit and the learning processing unit, for example. The memory and the auxiliary memory correspond to the learning table holding unit and the learning result holding unit, for example. The wired IF corresponds to a part of the load information processing unit, a part of the handover processing unit and a part of the learning result processing unit, for example.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A method for controlling a load in a base station device, the method comprising:
   receiving load information from another base station whose workload interpretation standard is different than that of the base station device;
   receiving, from the another base station, admission information that indicates whether an admission of a process request for the another base station to perform a first process is permitted or rejected;
   storing history information that indicates a state of the another base station when the first process is permitted or rejected; and
   determining, based on a determination criterion, the workload interpretation standard of the another base station in order to determine whether to request the another base station to perform a second process that causes a load that is equivalent to or lower than the first process, the determination criterion being changed in accordance with load information newly received from the another base station and the stored history information by;
   calculating a threshold used to determine whether a load of the another base station is high or low, based on the history information;
   determining, based on the calculated threshold, whether a load indicated in the load information is high or low; and
   changing the determination criterion, based on the determination of whether the load is high or low, wherein the load information includes a plurality of information elements;
   in the storing the history information, when the admission information indicating that the admission of the request is rejected is included in the history information, and a value of an information element other than a first information element of the load information is equal to or lower than a predetermined threshold, a piece of the history information that associates the admission information with the first information element is stored for each of destination base stations; and
   the threshold is calculated based on the admission information and the first information element of the another base station which are included in the history information.

2. The method according to claim 1, wherein the first process and second process are handover requests.

3. The method according to claim 1, wherein
   the another base station transmits the load information of the another base station and the admission information, and
   when the admission information is received from the another base station, the load information of the another base station is received.

4. A method for controlling a load in a base station device, the method comprising:
   receiving load information from another base station whose workload interpretation standard is different than that of the base station device;
   receiving, from the another base station, admission information that indicates whether an admission of a process request for the another base station to perform a first process is permitted or rejected;
   storing history information that indicates a state of the another base station when the first process is permitted or rejected; and
   determining, based on a determination criterion, the workload interpretation standard of the another base station in order to determine whether to request the another base station to perform a second process that causes a load that is equivalent to or lower than the first process, the determination criterion being changed in accordance with load information newly received from the another base station and the history information by:
   calculating a threshold used to determine whether a load of the another base station is high or low, based on the history information, determining, based on the calculate threshold, whether a load indicated in the load information is high or low, and changing the determination criterion, based on the determination of whether the load is high or low, wherein in the first process, as a remaining time of a timer that is activated in the changing the determination criterion becomes shorter, a higher probability of transmitting the request to perform the first process is determined for the another base station that is excluded from candidates for a base station to be subjected to the first process and whose load is close to the threshold that is used to determine whether the load of the another base station is high or low, and as a determined probability of transmitting the request to perform the first process becomes higher, the request to perform the first process is transmitted at a higher probability.

5. The method according to claim 4, wherein when an activated timer has expired, the threshold that is used to determine whether the load of the another base station is high or low is recalculated.

6. The method according to claim 4, wherein when an applicability of the threshold that is used to determine whether the load of the another base station is high or low is lower than a predetermined threshold, the threshold that is used to determine whether the load of the another base station is high or low is recalculated on the basis of the load information and the admission information.

7. The method according to claim 6, wherein when the applicability of the threshold that is used to determine whether the load of the another base station is high or low is lower than the predetermined threshold, the predetermined threshold is changed, and the threshold that is used to determine whether the load of the another base station is high or low is recalculated.

8. A base station of a wireless communication system, the base station comprising:

a communication interface configured
to receive load information from another base station whose workload interpretation standard is different than that of the base station of the wireless communication system, and
to receive, from the another base station, admission information that indicates whether an admission of a process request for the another base station to perform a first process is permitted or rejected;

a memory configured to store history information that indicates a state of the another base station when the first process is permitted or rejected; and a processor configured to determine, based on a determination criterion, the workload interpretation standard of the another base station in order to determine whether to request the another base station to perform a second process that causes a load that is equivalent to or lower than the first process, the determination criterion being changed in accordance with load information newly received from the another base station and the stored history information by:

calculating a threshold that is used to determine whether a load of the another base station is high or low, based on the history information;

determining, based on the calculated threshold, whether a load indicated in the load information is high or low; and changing the determination criterion, based on the determination of whether the load is high or low, wherein the load information includes a plurality of information elements;

in the storing the history information, when the admission information indicating that the admission of the request is rejected is included in the history information, and a value of an information element other than a first information element of the load information is equal to or lower than a predetermined threshold, a piece of the history information that associates the admission information with the first information element is stored for each of destination base stations; and the threshold is calculated based on the admission information and the first information element of the another base station which are included in the history information.

9. A management device of a wireless communication system, the management device comprising:

a communication interface configured
to receive load information from a base station whose workload interpretation standard is different than that of the management device, and
to receive, from the base station, information that indicates that an admission of a process request for the base station to perform a first process is permitted or rejected;

a memory configured to store history information that indicates a state of the base station when the first process is permitted or rejected; and a processor configured to determine, based on a determination criterion, the workload interpretation standard of the base station in order to determine whether to request the base station to perform a second process that causes a load that is equivalent to or lower than the first process, the determination criterion being changed in accordance with load information newly received from the base station and the history information by:

calculating a threshold used to determine whether a load of the base station is high or low, based on the history information, determining, based on the calculate threshold, whether a load indicated in the load information is high or low, and changing the determination criterion, based on the determination of whether the load is high or low, wherein the load information includes a plurality of information elements;

in the storing the history information, when the admission information indicating that the admission of the request is rejected is included in the history information, and a value of an information element other than a first information element of the load information is equal to or lower than a predetermined threshold, a piece of the history information that associates the admission information with the first information element is stored for each of destination base stations; and the threshold is calculated based on the admission information and the first information element of the base station which are included in the history information.

* * * * *